United States Patent
Eskildsen et al.

(10) Patent No.: US 11,425,199 B2
(45) Date of Patent: Aug. 23, 2022

(54) HOME NETWORK USING MULTIPLE WIRELESS NETWORKING PROTOCOLS

(71) Applicant: Ademco Inc., Golden Valley, MN (US)

(72) Inventors: Kenneth Eskildsen, Great Neck, NY (US); Robert D. Juntunen, Minnetonka, MN (US); William R. Blum, Huntington Station, NY (US)

(73) Assignee: Ademco Inc., Golden Valley, MN (US)

( * ) Notice: Subject to any disclaimer, the term of this patent is extended or adjusted under 35 U.S.C. 154(b) by 142 days.

(21) Appl. No.: 16/831,476

(22) Filed: Mar. 26, 2020

(65) Prior Publication Data

US 2021/0306426 A1    Sep. 30, 2021

(51) Int. Cl.
*H04L 67/125* (2022.01)
*H04W 4/38* (2018.01)
(Continued)

(52) U.S. Cl.
CPC ........... *H04L 67/125* (2013.01); *H04B 1/713* (2013.01); *H04L 61/6022* (2013.01);
(Continued)

(58) Field of Classification Search
CPC ............... H04L 67/125; H04L 61/6022; H04L 61/6036; H04L 69/18; H04L 67/12;
(Continued)

(56) References Cited

U.S. PATENT DOCUMENTS

| 2009/0243869 | A1 | 10/2009 | Sanderford, Jr. | |
| 2010/0172267 | A1* | 7/2010 | Viorel | H04B 7/022 370/254 |

(Continued)

FOREIGN PATENT DOCUMENTS

| CN | 203274797 U | 11/2013 |
| EP | 3596948 A1 | 1/2020 |

OTHER PUBLICATIONS

Kobayashi et al., "Proposal IEEE 802.11 Wake-Up Control Method Using IEEE 802.15.4 for Low Energy Consumption", May 17, 2018, 2018 5th International Conference on Business and Industrial Research (ICBIR), IEEE, pp. 17-20.*

(Continued)

*Primary Examiner* — Kwang B Yao
*Assistant Examiner* — Syed M Bokhari
(74) *Attorney, Agent, or Firm* — Shumaker & Sieffert, P.A.

(57) ABSTRACT

A sensor device includes processing circuitry configured to output, at a first bandwidth, first bandwidth data to a hub device using a first wireless connection configured for a first wireless protocol. In response to determining that the sensor device has second bandwidth data to output to the hub device at a second bandwidth, the processing circuitry is configured to output a second wireless connection request to the hub device using the first wireless connection. In response to the hub device outputting information for establishing a second wireless connection with the sensor device, the processing circuitry is configured to establish the second wireless connection for a second wireless protocol different from the first wireless protocol. The processing circuitry is configured to output, at the second bandwidth, the second bandwidth data to the hub device using the second wireless connection. The second bandwidth is greater than the first bandwidth.

19 Claims, 10 Drawing Sheets

(51) Int. Cl.
| | |
|---|---|
| *H04W 4/80* | (2018.01) |
| *H04B 1/713* | (2011.01) |
| *H04L 101/622* | (2022.01) |
| *H04L 101/636* | (2022.01) |
| *H04W 72/04* | (2009.01) |
| *H04W 80/02* | (2009.01) |
| *H04W 84/12* | (2009.01) |
| *H04W 84/18* | (2009.01) |

(52) U.S. Cl.
CPC .......... *H04L 61/6036* (2013.01); *H04W 4/38* (2018.02); *H04W 4/80* (2018.02); *H04W 72/0453* (2013.01); *H04W 80/02* (2013.01); *H04W 84/12* (2013.01); *H04W 84/18* (2013.01)

(58) Field of Classification Search
CPC .......... H04B 1/713; H04W 4/38; H04W 4/80; H04W 72/0453; H04W 80/02; H04W 84/12; H04W 84/18; H04W 76/15

USPC .................................................. 370/338, 254
See application file for complete search history.

(56) References Cited

U.S. PATENT DOCUMENTS

| | | | |
|---|---|---|---|
| 2012/0117213 A1* | 5/2012 | Shaffer | ................. H04L 47/726 709/223 |
| 2017/0332049 A1 | 11/2017 | Zhang | |

OTHER PUBLICATIONS

Kobayashi et al., "Proposal of IEEE 802.11 Wake-Up Control Method Using IEEE 802.15.4 for Low Energy Consumption," IEEE, 2018 5th International Conference on Business and Industrial Research (ICBIR), May 17-18, 2018, pp. 17-20.

Reyes Chaidez, "Guidelines for Building Hybrid Applications Based on Bluetooth Low Energy and IEEE 802.15.4 Protocols," Instituto Tecnológico y de Estudios Superiores de Occidente, Dec. 1, 2016, 60 pp.

Press Release entitled "Redpine Launches Industry-Leading Dual-Mode Bluetooth 5 Secure MCU Solution," Redpine Signals, Inc., Aug. 28, 2018, 5 pp.

Article entitled "Control the Internet of Green Things—Universal IoT Hub-Mini (GV-Controller-S)," Greenvity Communications, 2014, 3 pp. (Applicant points out, in accordance with MPEP 609.04(a), that the year of publication, 2014, is sufficiently earlier than the effective U.S. filing date, so that the particular month of publication is not in issue.).

Product Brief entitled "QPG6095 Zigbee/Thread/Bluetooth Low Energy Smart Home Communications Controller," from Qorvo, Inc., 2019, 3 pp. (Applicant points out, in accordance with MPEP 609.04(a), that the year of publication, 2019, is sufficiently earlier than the effective U.S. filing date, so that the particular month of publication is not in issue.).

* cited by examiner

HOME NETWORK USING MULTIPLE WIRELESS NETWORKING PROTOCOLS

TECHNICAL FIELD

This disclosure relates to networks, particularly networks used in, for example, home monitoring systems, comfort systems, and security systems.

BACKGROUND

A home network may use a wireless network protocol to connect devices within the home. For example, a hub device may use IEEE 802.15.4 to connect to over one hundred sensor devices in a home to a hub device. The hub device may then collect sensor data collected by the sensor devices in the home. For instance, the hub device may collect temperature readings from multiple temperature sensors arranged within the house and output the temperature readings to a thermostat that controls an HVAC system using the temperature readings. In another instance, the hub device may collect door/window sensor readings and output the door/window sensor readings to a home security sensor.

SUMMARY

In general, this disclosure relates to systems, devices, and techniques for wirelessly connecting devices using multiple wireless protocols. For example, a sensor device of a home network may connect to a hub device using a first wireless protocol having a relatively low bandwidth capability (e.g., IEEE 802.15.4) to output a battery status of the sensor device to the hub device. In this example, the sensor device may connect to the hub device using a second wireless protocol having a relatively high bandwidth capability (e.g., BLUETOOTH) to output video data generated by the sensor device to the hub device. In this way, sensor devices of the home network may dynamically select a wireless protocol based on the data to be transmitted to and from the sensor device.

In some examples, this disclosure describes a sensor device of a set of sensor devices configured to be enrolled with a hub device. The sensor device includes processing circuitry configured to: output, at a first bandwidth, first bandwidth data to the hub device using a first wireless connection configured for a first wireless protocol; in response to determining that the sensor device has second bandwidth data to output to the hub device at a second bandwidth, output a second wireless connection request to the hub device using the first wireless connection configured for the first wireless protocol; in response to the hub device outputting, in response to the second wireless connection request, information for establishing a second wireless connection with the sensor device, establish the second wireless connection, the second wireless connection being configured for a second wireless protocol different from the first wireless protocol; and output, at the second bandwidth, the second bandwidth data to the hub device using the second wireless connection, the second bandwidth being greater than the first bandwidth.

In some examples, this disclosure describes a method that includes outputting, by processing circuitry of a sensor device, at a first bandwidth, first bandwidth data to a hub device using a first wireless connection configured for a first wireless protocol; in response to determining that the sensor device has second bandwidth data to output to the hub device at a second bandwidth, outputting, by the processing circuitry, a second wireless connection request to the hub device using the first wireless connection configured for the first wireless protocol; in response to the hub device outputting, in response to the second wireless connection request, information for establishing a second wireless connection with the sensor device, establishing, by the processor, the second wireless connection, the second wireless connection being configured for a second wireless protocol different from the first wireless protocol; and outputting, by the processing circuitry, at the second bandwidth, the second bandwidth data to the hub device using the second wireless connection, the second bandwidth being greater than the first bandwidth.

A system, as described in some examples, includes: a hub device; a plurality of sensor devices enrolled with the hub device, wherein a sensor device of the plurality of sensor devices comprises first processing circuitry configured to: output, at a first bandwidth, first bandwidth data to the hub device using a first wireless protocol; and in response to determining that the sensor device has second bandwidth data to output to the hub device at a second bandwidth, output a second wireless connection request to the hub device using the first wireless protocol; wherein the hub device comprises second processing circuitry configured to output information for establishing a second wireless connection with the sensor device in response to the second wireless connection request; and wherein the first processing circuitry is further configured to: in response to the hub device outputting the information for establishing the second wireless connection, establish the second wireless connection using a second wireless protocol different from the first wireless protocol to establish the second wireless connection; and output, at a second bandwidth, the second bandwidth data to the hub device using the second wireless connection, the second bandwidth being greater than the first bandwidth.

The details of one or more examples of the disclosure are set forth in the accompanying drawings and the description below. Other features, objects, and advantages will be apparent from the description, drawings, and claims.

DETAILED DESCRIPTION

Figure 1A:
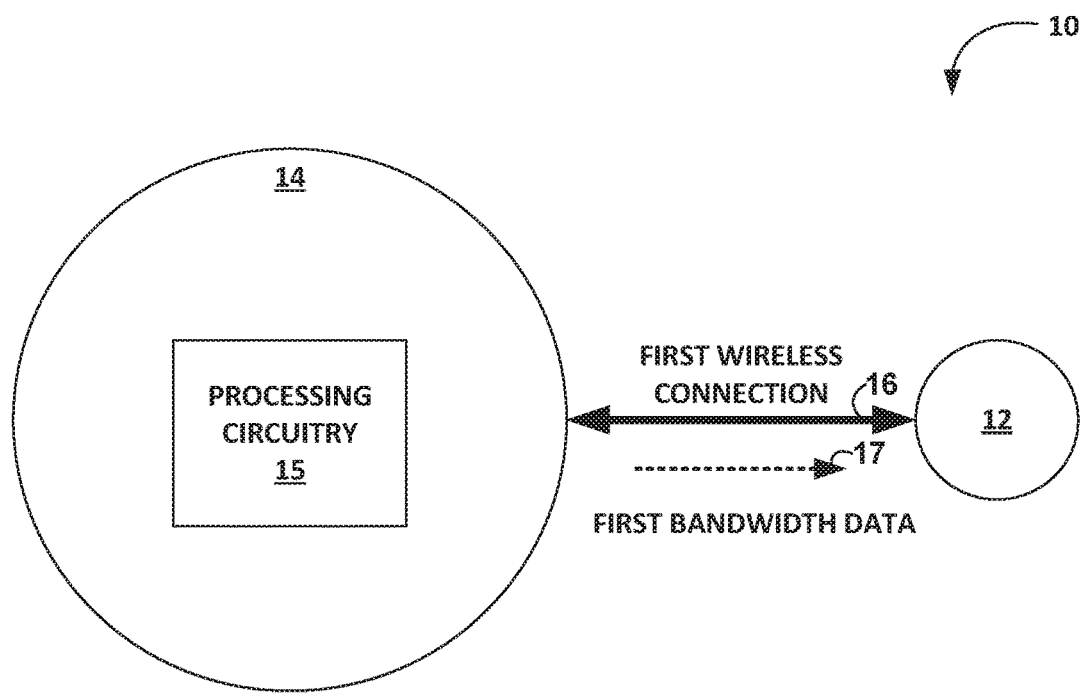
FIG. 1A is a conceptual diagram illustrating a sensor device establishing a first wireless connection and exchanging first bandwidth data, in accordance with some examples of this disclosure.

Modern residential buildings or other buildings may include a central "hub" device configured to manage one or more systems within the building, such as monitoring systems, comfort systems, or other security systems. The hub device may be in wireless communication with a number of other devices placed throughout the building. For example, the central hub device may wirelessly receive sensor data from any number of different sensor devices, such as motion sensors, air quality and/or temperature sensors, infrared sensors, door and/or window contact sensors, and/or other sensor devices. Additionally, the hub device may wirelessly transmit commands or instructions to one or more controllable sensor devices. For example, the hub device may instruct a thermostat to adjust a temperature within the building, or in another example, may command a damper to open or close an air vent.

In some applications for managing one or more systems within a building, BLUETOOTH radio communication techniques may have an advantage over other radio connection techniques such as, for example, IEEE 802.15.4 radio communication techniques. For instance, BLUETOOTH radio communications techniques may support high data rates and throughput compared to IEEE 802.15.4 radio communication techniques. For example, BLUETOOTH may have a base bandwidth of greater than 500 kilobits-per-second (kbps) (e.g., 1 Mbps) and IEEE 802.15.4 may have a base bandwidth of less than 500 kbps (e.g., 250 kbps). From a range perspective, BLUETOOTH radio techniques and IEEE 802.15.4 radio communication techniques may have nearly equal link budget. As used herein link budget may refer to power gains and losses that a communication signal experiences when transmitted through a medium (e.g., free space, walls, signal noise etc.). In some examples, BLUETOOTH may have a join time (e.g., latency) of greater than 1 second (e.g., 3 seconds) and IEEE 802.15.4 may have a join time of less than 1 second (e.g., 30 milliseconds (ms)).

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range. In some examples, each frequency channel of the BLUETOOTH channel may have a center frequency different from a central frequency of a neighboring channel by less than 1 MHz. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

As used herein, BLUETOOTH may refer to communications that use frequency hopping, such as, for example, frequency-hopping spread spectrum, to avoid interference from other radio communications. For example, a device using a BLUETOOTH LE channel may operate a BLUETOOTH LE channel that hops between 3 frequency channels when using advertising channels and 37 frequency channels when operating without advertising channels. In contrast, IEEE 802.15.4 may instead use a direct sequence spread spectrum technique. For example, a device may establish a wireless channel using IEEE 802.15.4 by mixing a signal signaling data for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Smart home devices may deploy many different wireless protocols to address the needs to the smart home. There are standards based protocols (Wi-Fi™, Zigbee™, Thread™, Zwave™, BLUETOOTH, DECT™, etc.) and proprietary, manufacture specific protocols. The issue with this array of protocols is that each protocol is tuned to a specific application. For example, Wi-Fi™ may be particularly useful for high bandwidth data applications that do not require long battery life. Zigbee™ may be particularly useful for low bandwidth data applications to maximize battery life. Additionally, not every wireless protocol is globally compliant. For example, Zwave™ may have different hardware designs for various operational regions.

As such, some smart home systems may include a collection of different networks that do not interoperate. For example, a Wi-Fi™ network of a smart home system may not operate with a BLUETOOTH network of the smart home system or a Zwave™ network of the smart home system. In this example, the BLUETOOTH network may not operate with the Zwave™ network.

In accordance with the techniques of the disclosure, a sensor device may be configured with a wireless protocol architecture that is globally compliant, provides long battery life, and has high bandwidth data capability that will work seamlessly within a smart home ecosystem. Techniques described herein may help to allow a smart home system to dynamically use multiple wireless network protocols to improve a performance of the smart home system. For example, rather than relying on a range of communications techniques and a person setting up a smart home system to carefully select compatible equipment, techniques described herein may permit a sensor device and/or hub device to address all the needs of a smart home system with a single network architecture, thus simplifying the installation. Techniques described herein may help to provide a connected home solution where all of the system components interoperate without the need for the installer to consider the type of protocol in use.

For example, a smart home system may include a hub device, friend node, and one or more sensor devices. Each component of the smart home system may be configured to operate according to a wireless protocol suitable for the type of service that the component provides. Components with multiple services may support multiple wireless protocols. For example, the smart home system may be configured to support Wi-Fi™ for connection to cloud services (e.g., the Internet), BLUETOOTH, and IEEE 802.15.4. In this example, the smart home system may use BLUETOOTH for high bandwidth services (e.g., audio/video and phone connectivity), IEEE 802.15.4 for low bandwidth services (e.g., telemetry data). Using the combination of Wi-Fi™, BLUETOOTH, and IEEE 802.15.4 may help to "fill in the gaps" of using just a single wireless protocol technique.

Sensor devices in the smart home network may include simple telemetry devices as well as more complex sensor devices (e.g., video recording sensors). Telemetry sensors, which may be referred to herein as a type of sensor device, may be configured to use the IEEE 802.15.4 protocol. More complex sensor devices that process audio and video may be configured to use two protocols. Such complex sensor devices may be configured to use IEEE 802.15.4 to provide sensor telemetry data (e.g., a status, a battery life, configuration data, etc.) and a BLUETOOTH protocol to provide high bandwidth data (e.g., phone connectivity, audio, image transfer, file transfer, etc.).

In accordance with the techniques of the disclosure, the smart home network may, in some examples, use a friend node that may be configured to communicate using multiple protocols. For example, the friend node may be configured to communicate using Wi-Fi™ BLUETOOTH, and IEEE 802.15.4. The friend node may be configured to: 1) provide a function (e.g., a thermostat, a keypad, a siren, a smoke and/or CO detector); 2) act as a repeater for sensor devices that are out of range of the hub device; 3) act as a hub device when there is not a hub device in the smart home network; and 4) effectively act as a range extender by converting sensor traffic to Internet Protocol (IP) traffic at that node and moving the data flow to cloud logic. In some examples, the friend node may have access to a main power (e.g., directly and/or indirectly via power stealing technologies) and/or may be configured with battery backup.

A hub device may be configured to communicate multiple protocols. For example, the hub device may be configured to communicate using Wi-Fi™, BLUETOOTH, and IEEE 802.15.4. The hub device may be configured to link data from the friend node(s) and sensor device(s) to the cloud services (e.g., the Internet).

In accordance with the techniques of the disclosure, a smart home network may use a radio co-existence manager (e.g., a hub device) configured to separate usage of the Radio Frequency (RF) medium with respect to the precise time (e.g., at which any channel is being used) and/or at what precise frequency is being used by that channel (e.g., a BLUETOOTH channel). By careful design and consideration by this manager, the three networks (e.g., a BLUETOOTH network, an IEEE 802.15.4 network, and a Wi-Fi™ network) can operate in a seamless fashion to an observer.

The combination of the techniques described herein may result in a robust network topology that may overcome regional regulatory differences and thus deliver whole home performance within a single framework.

FIG. 1A is a conceptual diagram illustrating a sensor device 14 establishing a first wireless connection 16 and exchanging first bandwidth data, in accordance with some examples of this disclosure. While system 10 illustrates only hub device 12 and sensor device 14, system 10 may include additional devices (e.g., devices in wireless communication with each other). System 10 may be installed within a building and the surrounding premises (referred to collectively in this disclosure as a "premise").

Hub device 12 may include a computing device configured to operate one or more systems within a building, such as comfort, security, and/or safety systems. For example, as described further below, hub device 12 may include processing circuitry configured to receive data, such as received from one or more devices and/or from user input, and process the data in order to automate one or more systems within a building. For example, hub device 12 may automate, control, or otherwise manage systems including heating and cooling, ventilation, illumination, or authorized access to individual rooms or other regions, as non-limiting examples. For example, hub device 12 may include a "Life and Property Safety Hub®" of Resideo Technologies, Inc.®, of Austin, Tex. Hub device 12 may include a wired connection to an electric power grid, but in some examples may include an internal power source, such as a battery, supercapacitor, or another internal power source.

Sensor device 14 may be configured enroll with hub device 12. For example, sensor device 14 may be configured to exchange sensor data with hub device 12 and/or be controlled by hub device 12. Sensor device 14 may be configured to collect or generate sensor data, and transmit the sensor data to hub device 12 for processing. In some examples, sensor device 14 may include a controllable device. A controllable device may be configured to perform a specified function when the controllable device receives instructions (e.g., a command or other programming) to perform the function from hub device 12. Examples of different types of sensor device 14 are included in the description of FIG. 2, below. Sensor device 14 may include either a wired connection to an electric power grid or an internal power source, such as a battery, supercapacitor, or another internal power source.

Processing circuitry 15 may be configured to establish first wireless connection 16 between sensor device 14 and hub device 12 using a first wireless connection configured for a first wireless protocol. The first wireless protocol may include, for example, but not limited to, a wireless connection protocol (e.g., a low-power wireless connection protocol). Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™, WirelessHART™, MiWi™, 6LoWPAN™, Thread™, SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. In some examples, first wireless connection 16 may conform to another connection protocol, such as, for instance, IEEE 802.11, commonly referred to as Wi-Fi™.

Although FIG. 1A shows hub device 12 as directly connected to sensor device 14 via first wireless connection 16, in some examples, system 10 may include one or more friend nodes that are each configured to act as an intermediary or "repeater" device. For example, first wireless connection 16 may represent a wireless connection established using one or more friend nodes configured in a mesh network, a star network, or another network for creating a communication link between sensor device 14 and hub device 12.

Processing circuitry 15 may be configured to output, at a first bandwidth, first bandwidth data 17 to hub device 12 using first wireless connection 16 configured for a first wireless protocol. The first wireless protocol may include an IEEE 802.15.4 wireless protocol. In some examples, first bandwidth data 17 may represent telemetry data. For example, sensor device 14 may periodically output first bandwidth data that includes telemetry data for sensor device 14. Examples of first bandwidth data may include, for example, but are not limited to, a status data for sensor device 14, a battery life data for sensor device 14, configuration data for sensor device 14, or other first bandwidth data. First bandwidth data 17 may include data that uses a relatively low bandwidth for transmission. For example, first bandwidth data 17 may include small packets of data that carry a relatively low amount of data may not need high bandwidth for transmission and such data may be referred to herein as first bandwidth data.

Figure 1B:
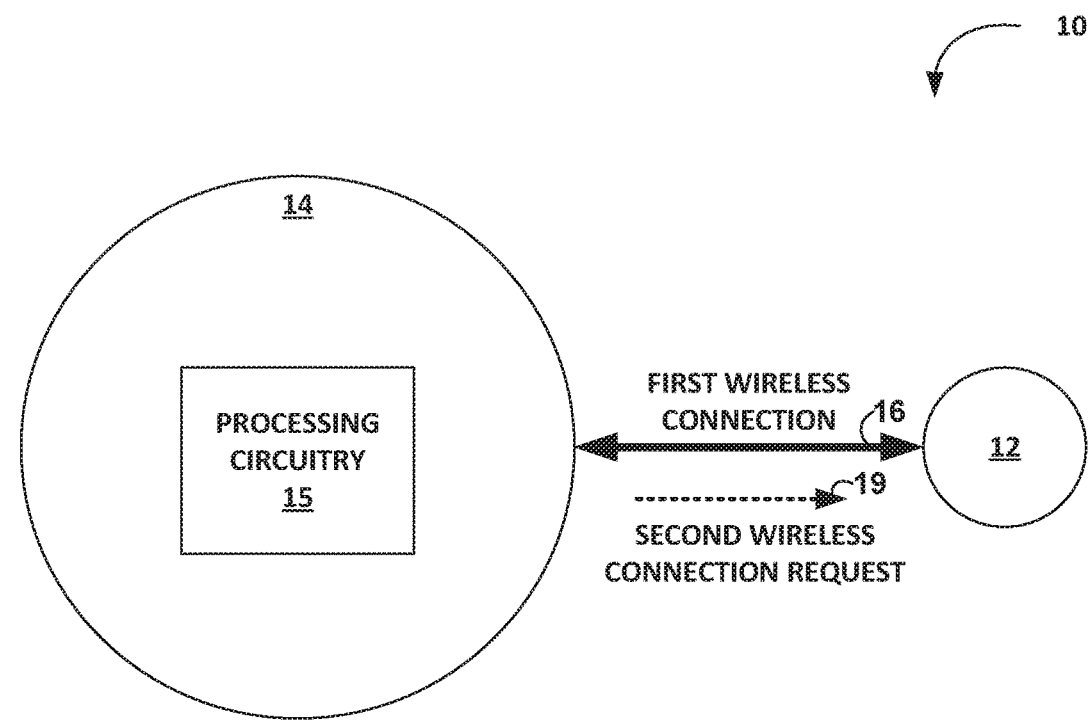
FIG. 1B is a conceptual diagram illustrating the sensor device of FIG. 1A exchanging a second wireless connection request, in accordance with some examples of this disclosure.

FIG. 1B is a conceptual diagram illustrating sensor device 14 of FIG. 1A exchanging a second wireless connection request 19, in accordance with some examples of this disclosure. In the example of FIG. 1B, processing circuitry 15 may determine that sensor device 14 has second bandwidth data to output to hub device 12. For example, processing circuitry 15 may be configured to generate sensor data, such as, for example, audio content, video content, or a combination of audio content and video content. In this example, processing circuitry 15 may determine that sensor device 14 has second bandwidth data to output to hub device 12 in response to determining that sensor data includes the audio content, video content, or a combination of audio content and video content. Second bandwidth data 19 may include data that uses a relatively high bandwidth for transmission. For example, second bandwidth data 17 may include large packets of data that carry relatively large packets of data that may use a high bandwidth for transmission and such data may be referred to herein as second bandwidth data. For instance, second bandwidth data 19 may rely on a higher bandwidth for transmission than first bandwidth data 19. In some instances, second bandwidth data 19 may include a larger amount of data than first bandwidth data 19 for transmission during a period of time.

In response to determining that sensor device 14 has second bandwidth data to output to hub device 12, processing circuitry 15 is configured to output a second wireless connection request 19 to hub device 12 using first wireless connection 16. As previously noted, first wireless connection 16 may be configured for the first wireless protocol (e.g., IEEE 802.15.4).

Although FIGS. 1A and 1B illustrate first bandwidth data 17 and second wireless connection request 19 as separate, in some examples, first bandwidth data 17 may include second wireless connection request 19. For instance, first bandwidth data 17 may include telemetry data for sensor device 14 and second wireless connection request 19. In this instance, processing circuitry 15 may output a transmission of network packets that signal both the telemetry data for sensor device 14 and second wireless connection request 19 without relying on a separate transmission for second wireless connection request 19.

Figure 1C:
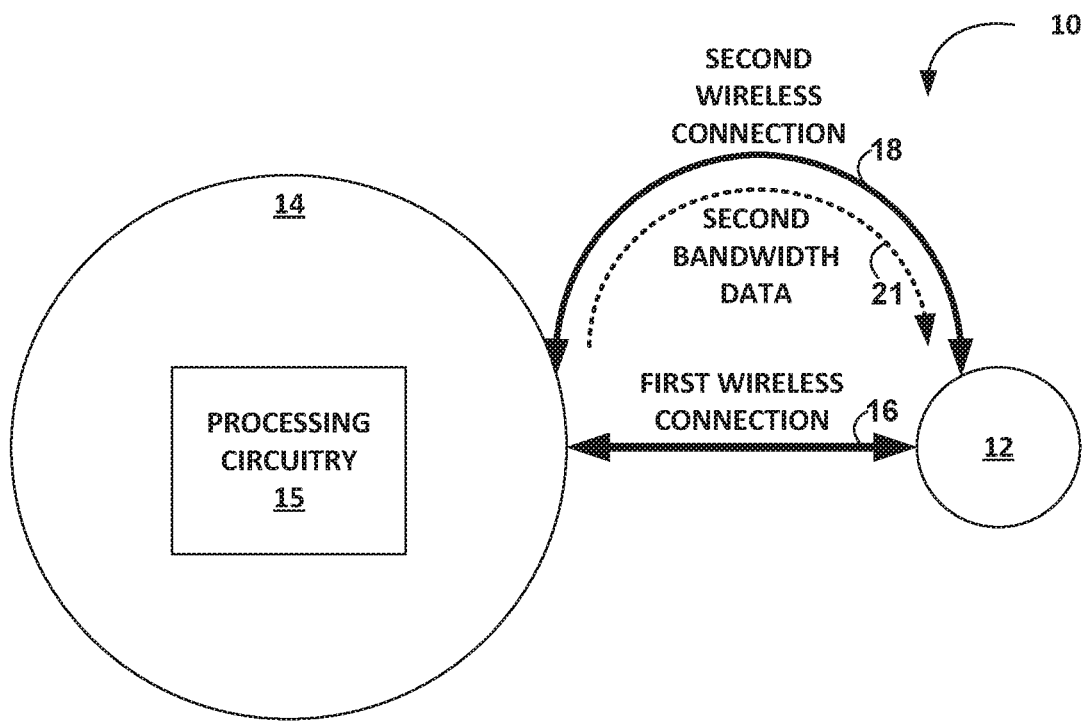
FIG. 1C is a conceptual diagram illustrating the sensor device of FIG. 1A establishing a second wireless connection and exchanging a second bandwidth data, in accordance with some examples of this disclosure.

FIG. 1C is a conceptual diagram illustrating sensor device 14 of FIG. 1A establishing a second wireless connection 18 and exchanging second bandwidth data 21, in accordance with some examples of this disclosure. Hub device 12 may be configured to output information for establishing a second wireless connection 18 with the sensor device in response to second wireless connection request 19. For instance, hub device 12 may be configured to advertise information for pairing with sensor device 14 in response to the second wireless connection request 19. For instance, hub device 12 may be configured to output information for establishing a second wireless connection 18 to include one or more network parameters for establishing a second wireless connection 18.

In response to hub device 12 outputting the information for establishing second wireless connection 18, processing circuitry 15 may be configured to establish second wireless connection 18. In some examples, second wireless connection 18 is configured for a second wireless protocol different from the first wireless protocol. For example, first wireless connection 16 may be configured for IEEE 802.15.4. In some examples, second wireless connection 18 may be configured for the BLUETOOTH wireless protocol.

Processing circuitry 15 may be configured to output, at a second bandwidth, second bandwidth data 21 to hub device 12 using second wireless connection 18. In some examples, processing circuitry 15 may output first bandwidth data 17 at a first bandwidth. In this example, processing circuity 15 may output second bandwidth data 21 at a second bandwidth that is greater than the first bandwidth. Second bandwidth data 21 may include video content, audio content, and/or other data.

Second wireless connection 18 may be configured to support a higher bandwidth than first wireless connection 16. For example, first wireless connection 16 may be configured for a first wireless protocol (e.g., IEEE 802.15.4) that specifies a first wireless protocol bandwidth limit. Processing circuitry 15 may output first bandwidth data 17 at a first bandwidth that is less than or equal to the first wireless protocol bandwidth limit. In this example, second wireless connection 18 may be configured for a second wireless protocol (e.g., BLUETOOTH) that specifies a second wireless protocol bandwidth limit that is greater than the first wireless protocol bandwidth. Processing circuitry 15 may output second bandwidth data 21 at a second bandwidth that is less than or equal to the second wireless protocol bandwidth limit. In this way, second wireless connection 18 may be configured to support a higher data rate than first wireless connection 16.

For example, processing circuitry 15 may output first bandwidth data 17 at a first bandwidth that is less than 500 kbit/s, less than 250 kbit/s, less than 100 kbit/s, etc. In this example, processing circuitry 15 may output second bandwidth data 21 at a second bandwidth that is greater than 250 kbit/s, greater than 1 Mbps, greater than 2 Mbps, greater than 3 Mbps, greater than 5 Mbps, greater than 10 Mbps, greater than 25 Mbps, etc. For instance, processing circuitry 15 may output first bandwidth data 17 at a first bandwidth that is less than 250 kbit/sand may output second bandwidth data 21 at a second bandwidth that is greater than 250 kbit/s.

Figure 1D:
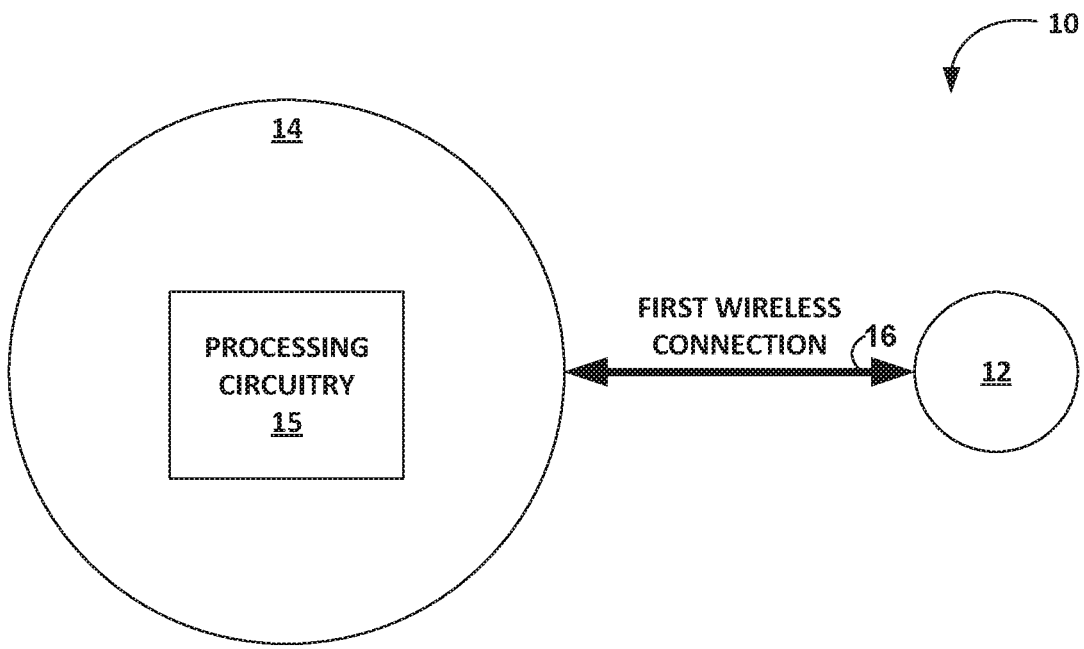
FIG. 1D is a conceptual diagram illustrating the sensor device of FIG. 1A terminating a second wireless connection, in accordance with some examples of this disclosure.

FIG. 1D is a conceptual diagram illustrating sensor device 14 of FIG. 1A terminating second wireless connection 18, in accordance with some examples of this disclosure. In the example of FIG. 1D, processing circuitry 15 may be configured to terminate second wireless connection 18 after outputting second bandwidth data 21. In some examples, processing circuitry 15 may be configured to terminate second wireless connection 18 a predetermined period of time after sensor device 14 establishes second wireless connection 18. Hub device 12 may be configured to terminate second wireless connection 18 a predetermined period of time after sensor device 14 establishes second wireless connection 18.

Terminating second wireless connection 18 may allow processing circuitry 15 to establish a connection to other sensor devices. For example, for BLUETOOTH there may be a relatively small number of wireless connections provided by the technology (e.g., less than 12 BLUETOOTH connections at one time) and IEEE 802.15.4 may not have this limitation. As such, to make a system with, 128 sensor devices, all using BLUETOOTH connections and IEEE 802.15.4 connections, the IEEE 802.15.4 connections can be constantly connected. However, in this example, the system may not be able to connect all the sensor devices using BLUETOOTH connections. As such, the system may only use a BLUETOOTH connection when communicating and then disconnect the BLUETOOTH connection to free the BLUETOOTH connection up for use by the other sensor devices in the network. In this example, the first wireless connection is an IEEE 802.15.4 connection and the second wireless connection is a BLUETOOTH connection, however, in other examples, other communication protocols may be used.

Figure 2:
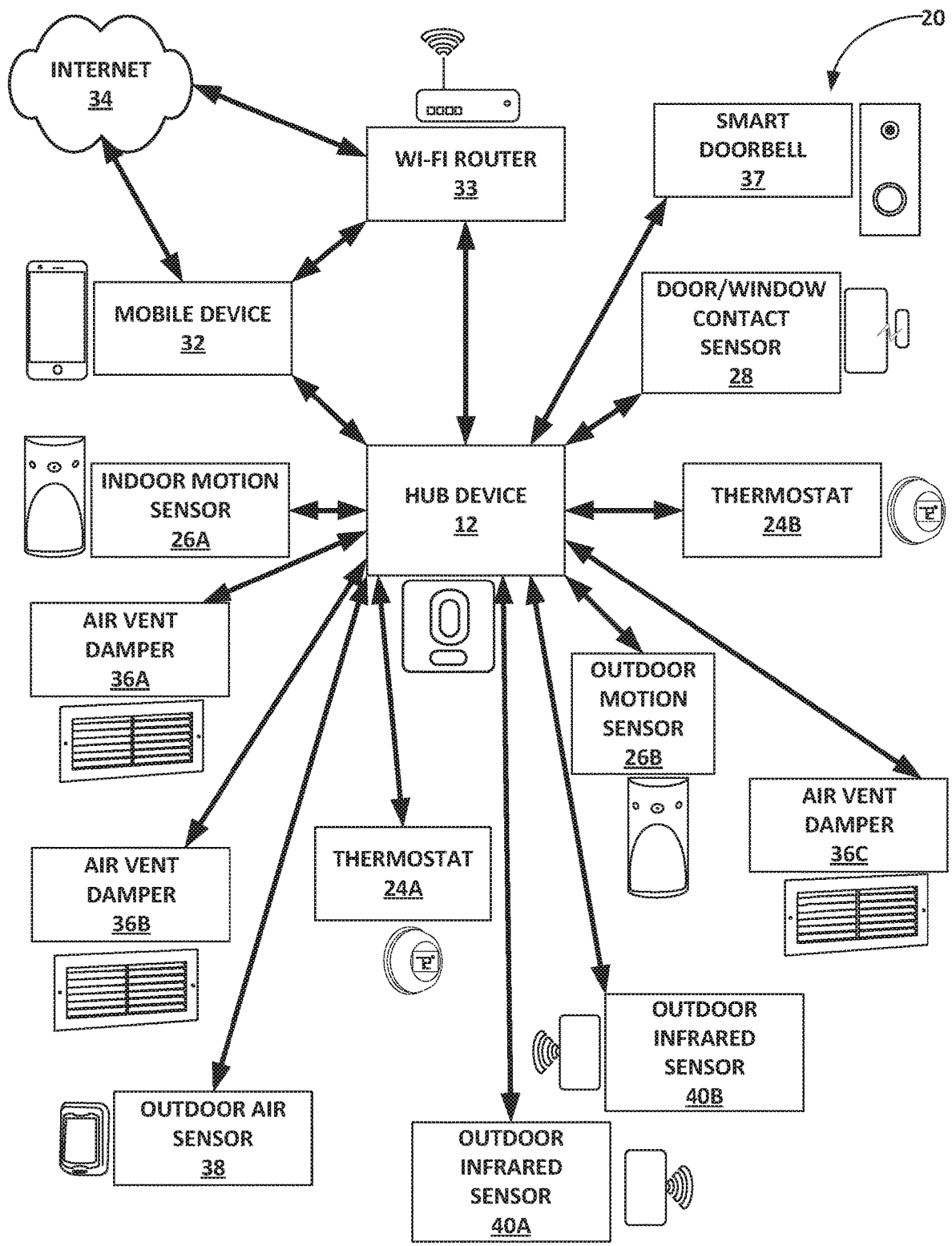
FIG. 2 is a conceptual block diagram illustrating an example of a home network, in accordance with some examples of this disclosure.

FIG. 2 is a conceptual block diagram illustrating a networked system 20, which may be one example of the networked system 10 of FIG. 1, in accordance with some examples of this disclosure. System 20 includes hub device 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. While hub device 12 is shown as a distinct component, hub device 12 may be integrated into one or more of thermostats 24, motion sensors 26, door/window contact sensor 28, air vent dampers 36, smart doorbell 37, outdoor air sensor 38, and infrared sensors 40.

System 20 is a non-limiting example of the techniques of this disclosure. Other example systems may include more, fewer, or different components and/or devices. While FIG. 2 illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1X, 2G, 3G™ 4G™, 5™, etc.), or another wireless broadband access.

Central hub device 12 may be in wireless data communication with thermostats 24, motion sensors 26, door/window contact sensor 28, air vent dampers 36, smart doorbell 37, outdoor air sensor 38, and infrared sensors 40. For example, thermostats 24, motion sensors 26, door/window contact sensor 28, air vent dampers 36, smart doorbell 37, outdoor air sensor 38, and infrared sensors 40 may be directly connected to hub device 12 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, smart doorbell 37, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 12.

Although not shown in the example of FIG. 2, central hub device 12 may be in indirect wireless data communication (e.g., communication via a friend node) with one or more of thermostats 24, motion sensors 26, door/window contact sensor 28, air vent dampers 36, smart doorbell 37, outdoor air sensor 38, and infrared sensors 40. For example, outdoor air sensor 38 may be indirectly connected thermostat to hub device 12 using a wireless channel according to a connection protocol, such as, but not limited to, for example, IEEE 802.15.4, BLUETOOTH, or another connection protocol. For instance, outdoor air sensor 38 may be connected to hub device 12 via thermostat 24A, outdoor infrared sensor 40A may be connected to hub device 12 via outdoor motion sensor 26B, etc.

Thermostats 24 may be configured to wirelessly transmit the temperature (e.g., sensor data) directly to hub device 12. Additionally, thermostats 24 may include controllable devices, in that they may activate or deactivate a heating, cooling, or ventilation system in response to receiving instructions from hub device 12. For example, thermostat 24A may collect temperature data and transmit the data to hub device 12. Hub device 12, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 12. Hub device 12 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 12. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 12. For instance, outdoor air sensor 38 may periodically output a current or average temperature to thermostats 24 via hub device 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 12. Hub device 12 may be configured to perform an action in response to receiving the sensor data, such as outputting an alert, such as a notification to mobile device 32, or by outputting a command for the respective passive infrared sensor 40 to output an audible or visual alert.

In accordance with the techniques of the disclosure, hub device 12 and one or more of, including each of, thermostats 24, motion sensors 26, door/window contact sensor 28, air vent dampers 36, smart doorbell 37, outdoor air sensor 38, and infrared sensors 40 may be configured to operate using a first wireless connection for a first wireless protocol and a second wireless connection for a second wireless protocol. While various examples described herein use IEEE 802.15.4 as an example of a first wireless protocol and BLUETOOTH as an example of a second wireless protocol, in some examples, other protocols may be used. Smart doorbell 37 is used as an example sensor device for example purposes only.

Hub device 12 and smart doorbell 37 may establish a first wireless connection configured for IEEE 802.15.4. In this example, smart doorbell 37 may output first bandwidth data (e.g., a battery level of smart doorbell 37) to hub device 12. In response to determining that smart doorbell 37 has second bandwidth data to output to hub device 12 at a second bandwidth, smart doorbell 37 may output a second wireless connection request to hub device 12 using the first wireless connection configured for IEEE 802.15.4. In this example, in response to hub device 12 outputting, in response to the second wireless connection request, information for establishing a second wireless connection with smart doorbell 37, smart doorbell 37 may establish a second wireless connection configured for BLUETOOTH and output, at a second bandwidth, the second bandwidth data (e.g., video data) to hub device 12 using the second wireless connection.

As discussed further below, any combination of thermostats 24, motion sensors 26, door/window contact sensor 28, air vent dampers 36, smart doorbell 37, outdoor air sensor 38, and infrared sensors 40 may be a configured as a "friend node." The friend node may be configured to act as an intermediary or "repeater" device using a first wireless connection and/or a second wireless connection. In some examples, a friend node may act as a repeater device for both first bandwidth data and second bandwidth. For instance, thermostat 24A may receive first bandwidth data and second bandwidth data from outdoor infrared sensor 40A and output the first bandwidth data and second bandwidth data received from outdoor infrared sensor 40A to hub device 12.

In some examples, different friend nodes may act as a repeater device for first bandwidth data and second bandwidth. For instance, thermostat 24A may receive first bandwidth data from outdoor infrared sensor 40A and output the first bandwidth data received from outdoor infrared sensor 40A to hub device 12. In this example, outdoor motion sensor 26B may receive second bandwidth data from outdoor infrared sensor 40A and output the second bandwidth data received from outdoor infrared sensor 40A to hub device 12.

Figure 3:
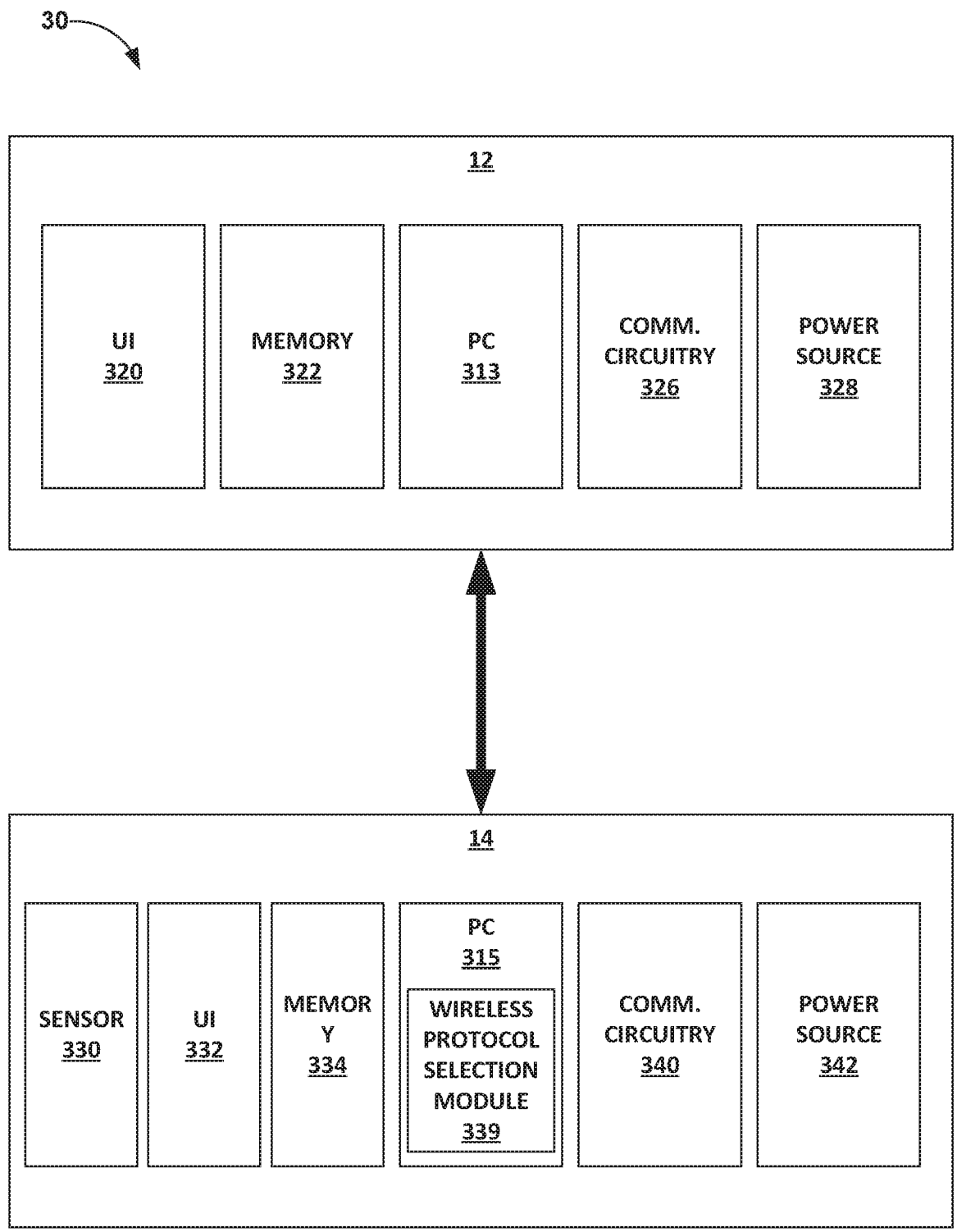
FIG. 3 is a conceptual block diagram of a hub device and a sensor device, in accordance with some examples of this disclosure.

FIG. 3 is a conceptual block diagram of a hub device 12 and a sensor device 14, in accordance with some examples of this disclosure. System 30 may be an example of any of the previous systems 10, 20, or another system. System 30 includes hub device 12 and sensor device 14.

Hub device 12 includes at least a user interface (UI) 320, a memory 322, processing circuitry (PC) 313, communication circuitry 326 ("COMM. CIRCUITRY"), and a power source 328. UI 320 is configured to receive data input from, or output data to, a user. For example, UI 320 may include a display screen, such as a touchscreen, keyboard, buttons, microphone, speaker, camera, or any other user input/output device. Other examples of UI 320 are possible. For example, during an initial setup process, hub device 12 may "scan" a local proximity in order to identify one or more other devices (e.g., devices having recognizable wireless communication capabilities), and then output for display on a display screen a list of the discovered devices for selection by a user. Via UI 320, a user may also specify one or more parameters in order to control or otherwise manage a comfort and/or security system within a building and the surrounding premises. For example, via UI 320, a user may specify one or more air temperature settings or security settings, such as access codes and/or authorized users.

Hub device 12 includes a memory 322 configured to store data, as well as instructions that, when executed by processing circuitry 313, cause hub device 12 to perform one or more techniques in accordance with this disclosure. Communication circuitry 326 may include components, such as an antenna, configured to wirelessly transmit and receive data according to one or more wireless communication protocols. For example, communication circuitry 326 may be configured to transmit and/or receive data according to either or both of the IEEE 802.15.4 protocol and/or the BLUETOOTH protocol where appropriate, according to one or more constraints of the respective data communication protocols (e.g., communication range, energy requirements, etc.).

Power source 328 may include a wired connection to an electric power grid, due to the energy-intensive operations performed by hub device 12. However, in some examples, power source 328 may additionally or alternatively include an internal power source, such as a battery or supercapacitor. In the example of FIG. 3, hub device 12 omits a sensor, however, in some examples, hub device 12 may further include one or more sensors. Additionally, hub device 12 may be configured as a friend node.

Sensor device 14 may be configured to wirelessly communicate with hub device 12. Sensor device 14 may include an incorporated sensor 330, a UI 332, a memory 334, processing circuitry (PC) 315, communication circuitry 340, and a power source 342. In some examples, sensor device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples. Processing circuitry 313 may include wireless protocol selection module 339 that may be configured to select a first wireless protocol or a second wireless protocol for establishing a wireless connection. In some examples, wireless protocol selection module 339 may be configured to select between three or more wireless protocols for establishing a wireless connection UI 330 is configured to receive data input from, or output data to, a user. For example, UI 330 may include a display screen, such as a touchscreen, keyboard, buttons, microphone, speaker, camera, or any other user input/output device. Other examples of UI 330 are possible. For example, during an initial setup process, sensor device 14 may "scan" a local proximity in order to identify one or more hub devices and/or other devices (e.g., devices having recognizable wireless communication capabilities), and then output for display on a display screen a list of discovered devices for selection by a user. Via UI 330, a user may also specify one or more parameters in order to control or otherwise manage a comfort and/or security system within a building and the surrounding premises. For example, via UI 330, a user may specify one or more air temperature settings (e.g., for a thermostat) or security settings, such as access codes and/or authorized users. Sensor device 14 includes a memory 334 configured to store data, as well as instructions that, when executed by processing circuitry 315, cause sensor device 14 to perform one or more techniques in accordance with this disclosure.

In accordance with the techniques of the disclosure, hub device 12 and sensor device 14 may be configured to operate using a first wireless connection for a first wireless protocol and a second wireless connection for a second wireless protocol. While various examples described herein use IEEE 802.15.4 as an example of a first wireless protocol and BLUETOOTH as an example of a second wireless protocol, in some examples, other protocols may be used.

Although FIG. 3 shows hub device 12 as directly connected to sensor device 14, in some examples, system 30 may include one or more friend nodes that are each configured to act as an intermediary or "repeater" device. For example, sensor device 14 may represent outdoor infrared sensor 40A of FIG. 2. In this example, sensor device 14 may output first bandwidth data and/or second bandwidth data to hub device 12 by outputting the first bandwidth data and second bandwidth data to thermostat 24A of FIG. 2. In this example, thermostat 24A of FIG. 2 may receive the first bandwidth data and/or second bandwidth data from outdoor infrared sensor 40A and output the first bandwidth data and/or second bandwidth data received from sensor device 14 to hub device 12.

Hub device 12 and sensor device 14 may establish a first wireless connection configured for IEEE 802.15.4. In this example, sensor device 14 may output first bandwidth data (e.g., status data) to hub device 12. Wireless protocol selection module 339 may be configured to determine whether sensor device 14 has second bandwidth data to output to hub device 12. For instance, wireless protocol selection module 339 may be configured to determine that sensor device 14 has second bandwidth data to output to hub device 12 in response to determining that sensor 330 generated sensor data that includes audio content, video content, or a combination of audio content and video content.

In response to determining that sensor device 14 has second bandwidth data to output to hub device 12, processing circuitry 315 may output a second wireless connection request to hub device 12 using the first wireless connection configured for IEEE 802.15.4. In this example, in response to hub device 12 outputting, in response to the second wireless connection request, information for establishing a second wireless connection with sensor device 14, processing circuitry 315 may establish a second wireless connection configured for BLUETOOTH.

Processing circuitry 315 and hub device 12 may exchange network parameters for a BLUETOOTH channel. For example, processing circuitry 315 may receive one or more network parameters for a second wireless connection from hub device 12. In this example, processing circuitry 315 may be configured to establish the second wireless connection using the one or more network parameters.

For example, processing circuitry 315 may determine (e.g., receive from hub device 12 or generate for output to hub device 12), one or more of: (1) a media access control (MAC) address of host device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

For example, processing circuitry 315 and hub device 12 may exchange, via the wireless channel, a MAC address for device 12 and a MAC address for sensor device 14. In this example, communication circuitry 326 and communication circuitry 340 may be configured to establish a BLUETOOTH channel between the MAC address for hub device 12 and the MAC address for sensor device 14.

In some examples, processing circuitry 315 and hub device 12 may exchange, via the wireless channel, an indication of a particular time to establish the BLUETOOTH channel. In this example, communication circuitry 326 and communication circuitry 340 may be configured to establish the BLUETOOTH channel between hub device 12 and sensor device 14 at the particular time.

For example, processing circuitry 315 and hub device 12 may exchange, via the wireless channel, an indication of a starting frequency to establish the BLUETOOTH channel. In this example, communication circuitry 326 and communication circuitry 340 may be configured to establish a BLUETOOTH channel between hub device 12 and sensor device 14 at the starting frequency. For instance, the BLUETOOTH LE channel between hub device 12 and sensor device 14 may include 37 1 MHz wide channels that are separated by 2 MHz. In this example, the starting frequency may be an indication of a particular 1 MHz wide channel (e.g., channel 0, 1, . . . 37) and communication circuitry 326 and communication circuitry 340 may be configured to establish a BLUETOOTH channel between hub device 12 and sensor device 14 at the particular 1 MHz wide channel.

Processing circuitry 315 and hub device 12 may exchange, via the wireless channel, an indication of a hop set for the BLUETOOTH channel, the hop set indicating a sequence of frequencies. In this example, communication circuitry 326 and communication circuitry 340 may be configured to establish a BLUETOOTH channel between hub device 12 and sensor device 14 to operate at the sequence of frequencies. For instance, the BLUETOOTH LE channel between hub device 12 and sensor device 14 may include 37 1 MHz wide channels that are separated by 2 MHz. In this example, the sequence of frequencies may be an indication of an order for switching between the 1 MHz wide channels (e.g., channel 0, 1, . . . 37) and communication circuitry 326 and communication circuitry 340 may be configured to establish a BLUETOOTH channel between hub device 12 and sensor device 14 that selects a 1 MHz wide channel according to the order for switching between the 1 MHz wide channels.

In some examples, processing circuitry 315 and hub device 12 may exchange, via the wireless channel, an indication of a connection interval for the BLUETOOTH channel. In this example, communication circuitry 326 and communication circuitry 340 may be configured to establish a BLUETOOTH channel between hub device 12 and sensor device 14 to operate at the connection interval. For instance, rather than exchanging data at any time on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at the connection interval.

Processing circuitry 315 and hub device 12 may exchange, via the wireless channel, an indication of a connection latency for the BLUETOOTH channel. In this example, communication circuitry 326 and communication circuitry 340 may be configured to establish a BLUETOOTH channel between hub device 12 and sensor device 14 to operate at the connection latency. For instance, rather than exchanging data at any time or at a connection interval on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at a latency interval of sensor device 14 or hub device 12. This latency interval may be selected to reduce a time a radio of sensor device 14 and/or hub device 12 listens for data (further from a connection interval), which may reduce a power consumption of sensor device 14 and/or hub device 12 compared to systems that omit a latency interval or use a zero latency interval.

Processing circuitry 315 and hub device 12 may exchange, via the wireless channel, an indication of antenna information for a plurality of antennas at sensor device 14. In this example, communication circuitry 326 and communication circuitry 340 may be configured to select a particular antenna from the plurality of antennas based on the antenna information and to establish a BLUETOOTH channel between hub device 12 and sensor device 14 using the particular antenna.

Once the second bandwidth connection is established, processing circuitry 315 may output, at a second bandwidth, the second bandwidth data (e.g., video data) to hub device 12 using the second wireless connection. Again, the second wireless connection may be configured to support a higher bandwidth than the first wireless connection. For example, the first wireless connection may be configured for IEEE 802.15.4, which may specifies a first wireless protocol bandwidth limit (e.g., less than 250 kbit/s). In this example, second wireless connection 18 may be configured for BLUETOOTH that specifies a second wireless protocol bandwidth limit (e.g., greater than 250 kbit/s) that is greater than the first wireless protocol bandwidth. In some examples, processing circuitry 315 may be configured to terminate the second wireless connection after outputting second bandwidth data 21. For instance, processing circuitry 315 may be configured to terminate the second wireless connection a predetermined period of time after sensor device 14 establishes the second wireless connection. In some examples, hub device 12 may be configured to terminate the second wireless connection a predetermined period of time after sensor device 14 establishes the second wireless connection.

Figure 4:
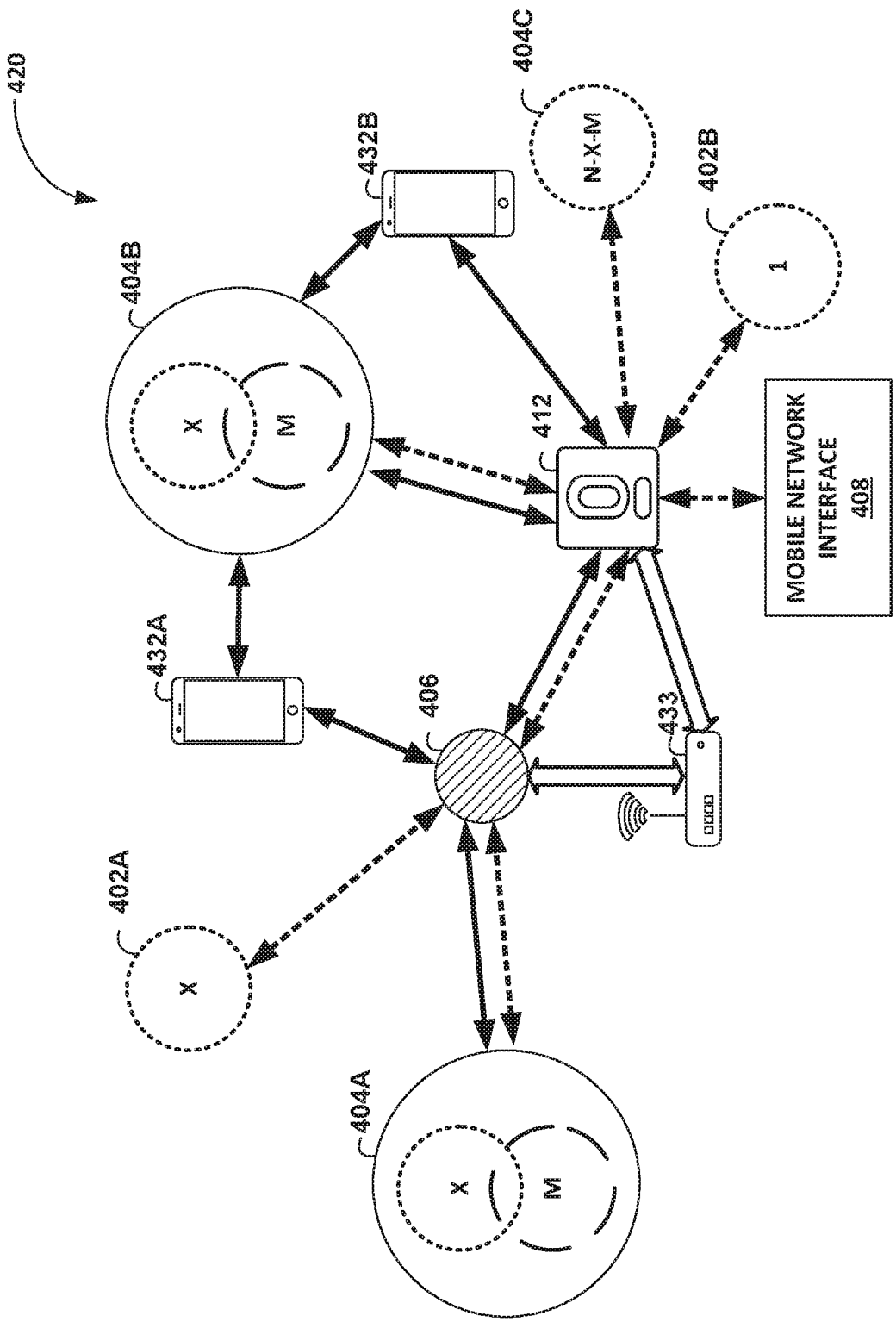
FIG. 4 is a conceptual block diagram of a hub device and a friend node, in accordance with some examples of this disclosure.

FIG. 4 is a conceptual block diagram of a hub device 412 and friend node 406, in accordance with some examples of this disclosure. System 420 includes hub device 412, low power nodes 402A-402C (collectively, "low power nodes 402), high speed nodes 432A-432B (collectively, "high speed nodes 432"), combined low power and high speed nodes 404A-404C (collectively, "combined nodes 404"), friend node 406, router 433, and mobile network interface 408. In some examples, hub device 412 may include a battery backup system. While hub device 412 is shown as a distinct component, hub device 412 may be integrated into one or more sensor devices. As shown, high speed nodes 432 may include a mobile device (e.g., smart phone). System 420 is a non-limiting example of the techniques of this disclosure. Other example systems may include more, fewer, or different components and/or devices. While the following discusses a low power wireless connections configured for IEEE 802.15.4 and a high speed connection as configured for BLUETOOTH, other wireless protocols may be used in other examples.

High speed nodes 432 may be configured to transmit data at a bandwidth that is greater than a bandwidth for data transmitted by low power nodes 402. For example, low power nodes 402 may be configured for a wireless connection bandwidth of less than 250 kbits/s. In some examples, high speed nodes 432 may be configured for speeds of greater than 250 kbits/s (e.g., 1 Mbits/s).

Hub device 412 and/or friend node 406 may be configured to establish a first number of concurrent first wireless connections. For instance, hub device 412 and/or friend node 406 may be configured to establish a wireless connection configured for a wireless protocol (e.g., IEEE 802.15.4) that supports up to 128 devices. In the example of FIG. 4, combined nodes 404 may represent 'M' number of devices that establish 'M' number of concurrent first wireless connections. For instance, combined nodes 404 may represent 'M' number of devices that establish 'M' number of concurrent IEEE 802.15.4 wireless connections. In this example, low power nodes 402A, 402B may represent 'X' number of devices that establishes 'X' number of first wireless connections concurrently with the 'M' number of concurrent first wireless connections. Low power node 402C may represent up to 'N-X-M' devices that establishe 'N-X-M' first wireless connections concurrently with the 'M' number and 'X' number of concurrent first wireless connections. In some examples, 'N' is 128.

Hub device 412 and/or friend node 406 may be configured to establish a second number of concurrent second wireless connections. In some examples, the first number of first concurrent bandwidth connections (e.g., IEEE 802.15.4 connections) is greater than the second number of concurrent second wireless connection (e.g., BLUETOOTH connections). For example, hub device 412 and/or friend node 406 may be configured to establish up to 7 second wireless connections concurrently, up to 4 second wireless connections concurrently, up to 3 second wireless connections concurrently, etc.

Mobile device 432 and/or router 433 may be connected to a wide area network (WAN), such as, for example, the Internet. Router 433 may represent a WAN interface to the WAN (e.g., the Internet). For example, router 433 may exchange data with friend node 406 and/or hub device 412 with a bandwidth of greater than 11 Mbits/s. An WAN interface may include, for example, but not limited to, a digital subscriber line (DSL), dial-up access, cable internet access, fiber-optic access, wireless broadband access, hybrid access networks, or other interfaces. In some examples, the WAN interface may include a Wi-Fi™ router, Ethernet, or another interface.

For example, one or more of low power nodes 402, combined nodes 404, friend node 406, and/or hub device 412 may be configured to output first bandwidth data to a WAN interface of router 433. In this example, first bandwidth data may include data output to hub device 412 and/or friend node 406 using an IEEE 802.15.4 connection configured for IEEE 802.15.4. In some examples, one or more of high speed nodes 432, combined nodes 404, friend node 406, and/or hub device 412 may be configured to output second bandwidth data to the WAN interface of router 433. In this example, second bandwidth data may include data output to hub device 412 and/or friend node 406 using a BLUETOOTH connection configured for the BLUETOOTH protocol. In some example, one or more of low power nodes 402, high speed nodes 432, combined nodes 404, friend node 406, and/or hub device 412 may be configured to output both first bandwidth data and second bandwidth data to the WAN interface of router 433.

Mobile network interface 408 may represent wireless broadband access. Examples of wireless broadband access may include, for example, satellite access, WiMax™, cellular (e.g., 1X, 2G, 3G™, LTE™, 4G™, 5G™, etc.), or another wireless broadband access. In some examples, mobile network interface 408 may include a battery backup system.

Friend node 406 may be configured to communicate using multiple protocols. For example, friend node 406 may be configured to communicate using Wi-Fi™, BLUETOOTH, and IEEE 802.15.4. Friend node 406 may be configured to provide a function (e.g., a thermostat, a keypad, a siren, a smoke and/or a carbon monoxide (CO) detector). In some examples, friend node 406 may be configured to act as a repeater for sensor devices that are out of range of hub device 412.

Friend node 406 may be configured to act as a repeater for wireless communications configured for a first wireless protocol (e.g., IEEE 802.15.4). For example, combined node 404A may be configured to output, at a first bandwidth, first bandwidth data to hub device 412. In this example, combined node 404A may output, at the first bandwidth, the first bandwidth data to friend node 406. Friend node 406 may be configured to output, at the first bandwidth, the first bandwidth data to hub device 412 using the first wireless protocol.

In some examples, friend node 406 may be configured to act as a repeater for wireless communications configured for a second wireless protocol (e.g., BLUETOOTH). For example, combined node 404A may be configured to output, at a second bandwidth, second bandwidth data to hub device 412. In this example, combined node 404A may output, at the second bandwidth, the second bandwidth data to friend node 406. Friend node 406 may be configured to output, at the second bandwidth, the second bandwidth data to hub device 412 using the second wireless protocol.

Friend node 406 may be configured to act as a hub device when there is not a hub device in the smart home network. In some examples, friend node 406 may be configured to effectively act as a range extender by converting sensor traffic to Internet Protocol (IP) traffic at that node and moving the data flow to cloud logic. For example, friend node 406 may output data (e.g., first bandwidth data, second bandwidth data, etc.) to router 433 for output to a cloud system. In some examples, friend node 406 may have access to a main power (e.g., directly and/or indirectly via power stealing technologies) and/or may be configured with battery backup.

In accordance with the techniques of the disclosure, hub device 412 may be configured to link data from sensor device(s) and/or friend node(s) to mobile network interface 408 to establish connectivity to cloud services (e.g., the Internet). System 420 may reduce the cloud connectivity costs by providing a network where minimal devices are connected to mobile network interface 408. For example, mobile network interface 408 may be configured to establish connectivity to cloud services (e.g., the Internet) using, for example, 4G™, 5G™, etc. In this example, hub device 412 may directly connect to mobile network interface 408. For instance, hub device 412 may register with mobile network interface 408 to associate data usage for hub device 412 to a user account. In this example, hub device 412 may be configured to provide data (e.g., first bandwidth data, second bandwidth data, or other data) from sensor devices (e.g., power nodes 402, high speed nodes 432, and combined nodes 404) to minimize a number of devices directly connected to mobile network interface 408. The sensor devices (e.g., power nodes 402, high speed nodes 432, and combined nodes 404) may not connect directly to mobile network interface 408. For instance, power node 402A may not register with mobile network interface 408 to associate data usage for power node 402A to a user account and power node 402A may instead rely on hub device 412 to provide connectivity to mobile network interface 408. In this way, a cost for connecting devices to mobile network interface 408 may be minimized because hub device 412 may forward data from other devices of system 420 instead of connecting each device of system 420 directly to mobile network interface 408.

Figure 5:
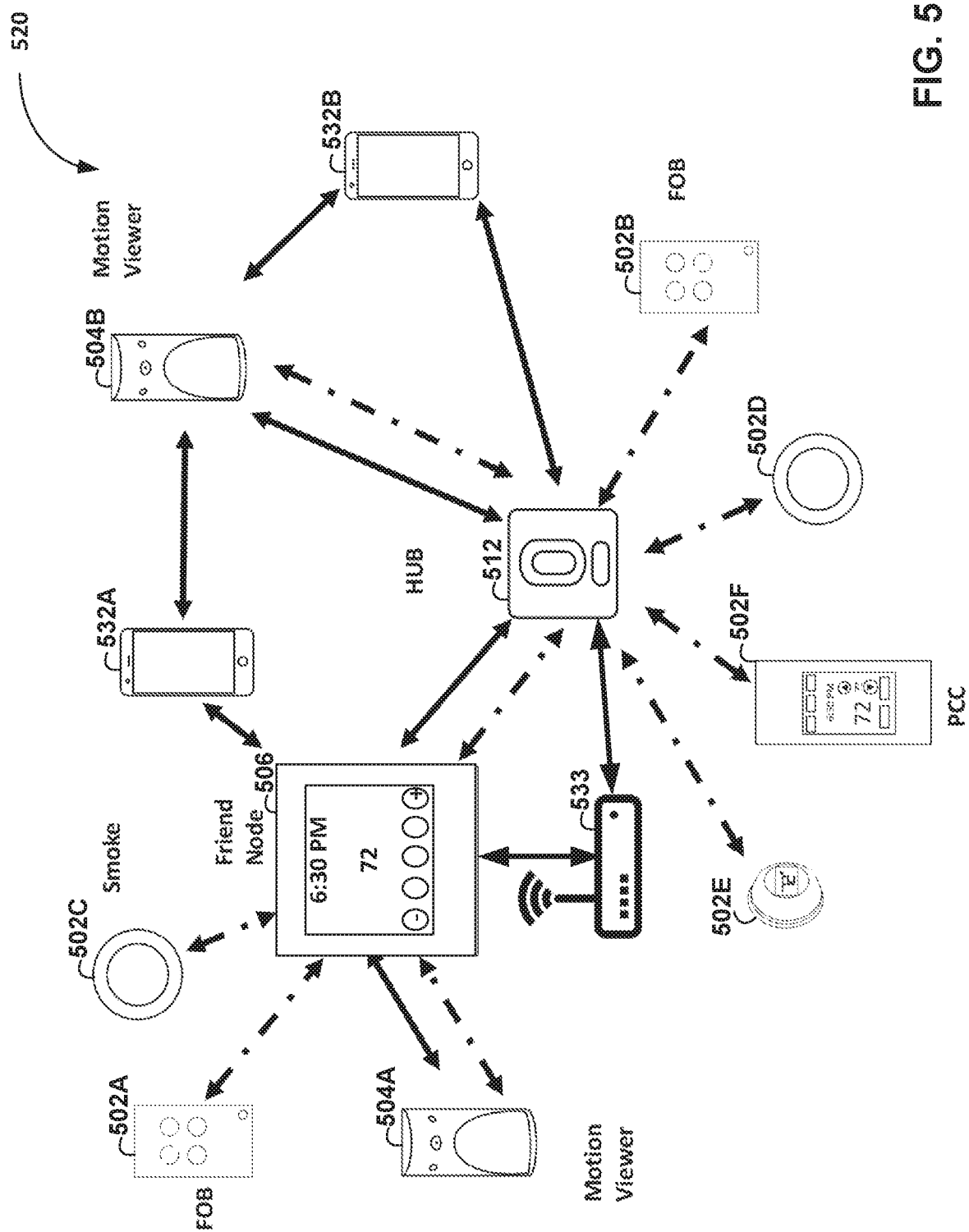
FIG. 5 is a conceptual block diagram of a first use case of a hub device and a friend node, in accordance with some examples of this disclosure.

FIG. 5 is a conceptual block diagram of a first use case of a hub device 512 and a friend node 506, in accordance with some examples of this disclosure. System 520 is a non-limiting example of the techniques of this disclosure. Other example systems may include more, fewer, or different components and/or devices. While the following discusses a low power wireless connections configured for IEEE 802.15.4 and a high speed connection as configured for BLUETOOTH, other wireless protocols may be used in other examples.

System 520 includes friend node 506, hub device 512, key fobs 502A, 502B, smoke detectors 502C, 502D, furnace controller 502E, portable comfort controller 502F ("PCC 502F"), motion viewers 504A, 504B, mobile devices 532A, 532B, and router 533. Key fob 502A, 502B, smoke detectors 502C, 502D, furnace controller 502E, portable comfort controller 502F may represent examples of low power nodes 402 of FIG. 4. Motion viewers 504A, 504B may represent examples of combined nodes 404 of FIG. 4. In the example of FIG. 5, friend node 506 may include a thermostat. Motion viewers 504 may be configured to communicate using IEEE 802.15.4 for alarms, adjustments, and supervision. In some examples, motion viewers 504 may be configured to communicate with BLUETOOTH for image transfer, video transfer, etc.

In accordance with the techniques of the disclosure, hub device 512, motion viewers 504A, 504B, and friend node 506 may be configured to operate using a first wireless connection for a first wireless protocol (e.g., IEEE 802.15.4) and a second wireless connection for a second wireless protocol (e.g., BLUETOOTH). While various examples described herein use IEEE 802.15.4 as an example of a first wireless protocol and BLUETOOTH as an example of a second wireless protocol, in some examples, other protocols may be used. Motion viewer 504A is used as an example sensor device for example purposes only.

Hub device 512 and motion viewer 504A may establish a first wireless connection configured for IEEE 802.15.4. In this example, motion viewer 504A may output first bandwidth data (e.g., a battery level of motion viewer 504A) to hub device 512. In response to determining that motion viewer 504A has second bandwidth data to output to hub device 512, motion viewer 504A may output a second wireless connection request to hub device 512 using the first wireless connection configured for IEEE 802.15.4. In this example, in response to hub device 512 outputting, in response to the second wireless connection request, information for establishing a second wireless connection with motion viewer 504A, motion viewer 504A may establish a second wireless connection configured for BLUETOOTH and output, at a second bandwidth, the second bandwidth data (e.g., video data) to hub device 512 using the second wireless connection.

Figure 6:
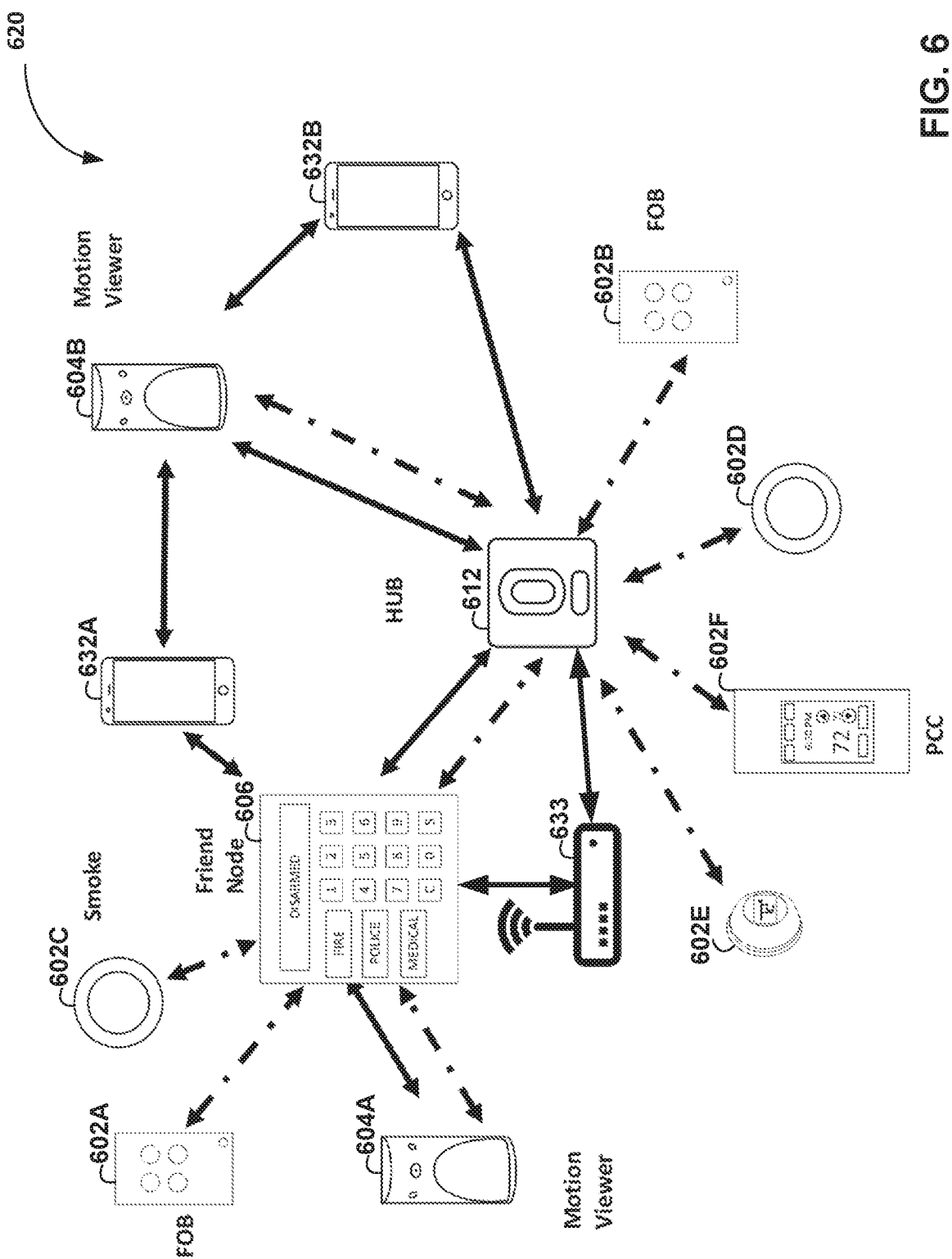
FIG. 6 is a conceptual block diagram of a second use case of a hub device and a friend node, in accordance with some examples of this disclosure.

FIG. 6 is a conceptual block diagram of a second use case of a hub device 612 and a friend node 606, in accordance with some examples of this disclosure. Other example systems may include more, fewer, or different components and/or devices. While the following discusses a low power wireless connections configured for IEEE 802.15.4 and a high speed connection as configured for BLUETOOTH, other wireless protocols may be used in other examples.

System 620 includes friend node 606, hub device 612, key fobs 602A, 602B, smoke detectors 602C, 602D, furnace controller 602E, portable comfort controller 602F ("PCC 602F"), motion viewers 604A, 604B, mobile devices 632A, 632B, and router 633. Key fob 602A, 602B, smoke detectors 602C, 602D, furnace controller 602E, portable comfort controller 602F may represent examples of low power nodes 402 of FIG. 4. Motion viewers 604A, 604B may represent examples of combined nodes 404 of FIG. 4. In the example of FIG. 6, friend node 606 may include a keypad. For instance, friend node 606 may be configured to generate a user input based on a user interaction with one or more keys of the keypad. In this example, friend node 606 may output the user input to hub device 612.

Figure 7:
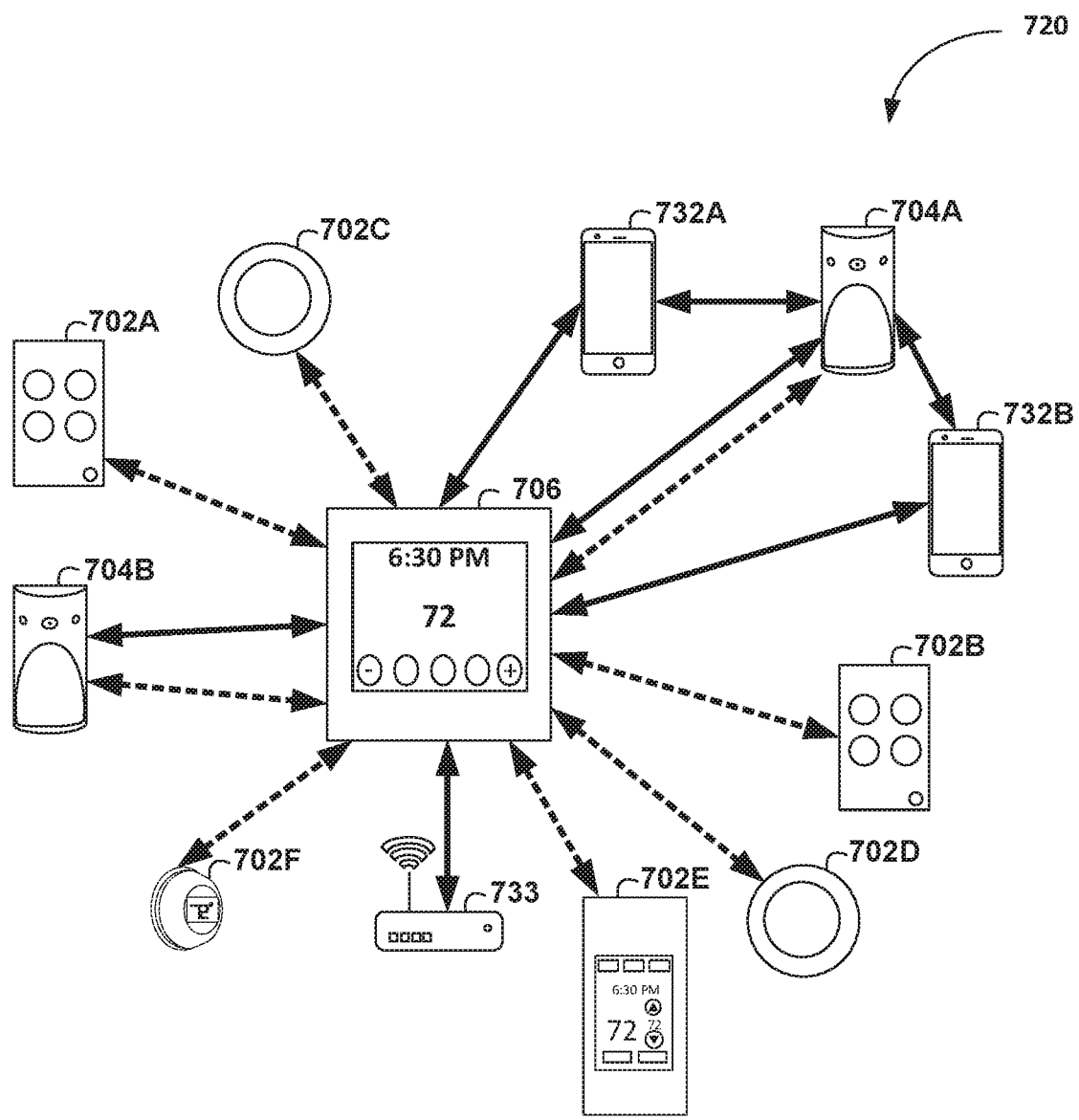
FIG. 7 is a conceptual block diagram of a third use case of a hub device and a friend node, in accordance with some examples of this disclosure.

FIG. 7 is a conceptual block diagram of a third use case of a hub device and a friend node, in accordance with some examples of this disclosure. Other example systems may include more, fewer, or different components and/or devices. While the following discusses a low power wireless connections configured for IEEE 802.15.4 and a high speed connection as configured for BLUETOOTH, other wireless protocols may be used in other examples.

System 720 includes friend node 706, key fobs 702A, 702B, smoke detectors 702C, 702D, furnace controller 702E, portable comfort controller 702F ("PCC 702F"), motion viewers 704A, 704B, mobile devices 732A, 732B, and router 733. Key fob 702A, 702B, smoke detectors 702C, 702D, furnace controller 702E, portable comfort controller 702F may represent examples of low power nodes 402 of FIG. 4. Motion viewers 704A, 704B may represent examples of combined nodes 404 of FIG. 4. In the example of FIG. 7, friend node 706 is a thermostat. Additionally, friend node 706 may represent a hub device for system 720.

Figure 8:
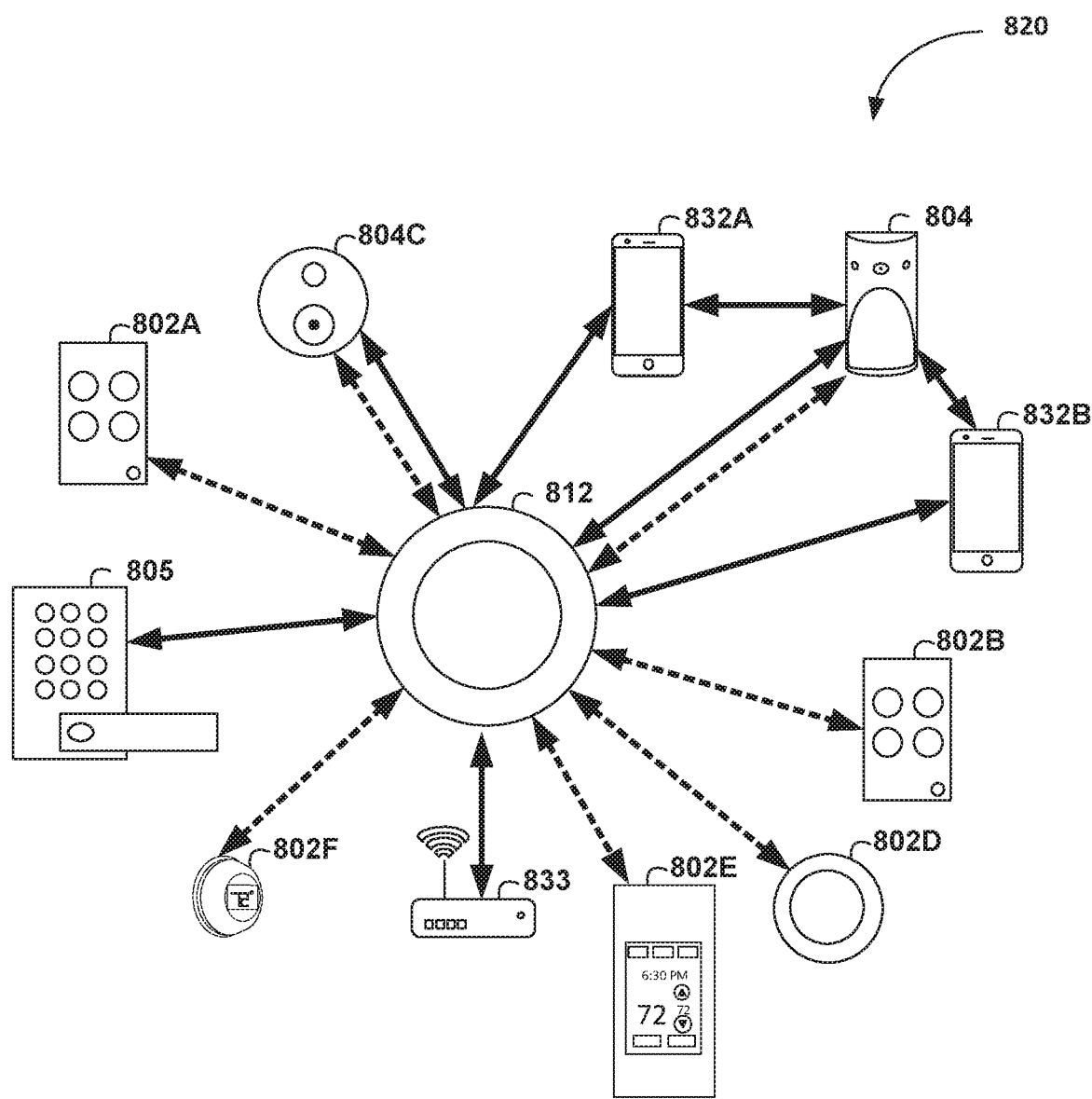
FIG. 8 is a conceptual block diagram of a fourth use case of a hub device and a friend node, in accordance with some examples of this disclosure.

FIG. 8 is a conceptual block diagram of a fourth use case of a hub device 812 and a friend node 806, in accordance with some examples of this disclosure. Other example systems may include more, fewer, or different components and/or devices. While the following discusses a low power wireless connections configured for IEEE 802.15.4 and a high speed connection as configured for BLUETOOTH, other wireless protocols may be used in other examples.

System 820 includes friend node 806, key fobs 802A, 802B, smoke detectors 802C, 802D, furnace controller 802E, portable comfort controller 802F ("PCC 802F"), motion viewer 804, smart lock 805, mobile devices 832A, 832B, and router 833. Key fob 802A, 802B, smoke detectors 802C, 802D, furnace controller 802E, portable comfort controller 802F may represent examples of low power nodes 402 of FIG. 4. Motion viewer 804 may represent an example of combined nodes 404 of FIG. 4. Smart lock 805 may represent an example of high speed nodes 432 of FIG. 4. In the example of FIG. 8, friend node 806 is a smoke detector with 2-way audio. Additionally, friend node 806 may represent a hub device for system 820.

Figure 9:
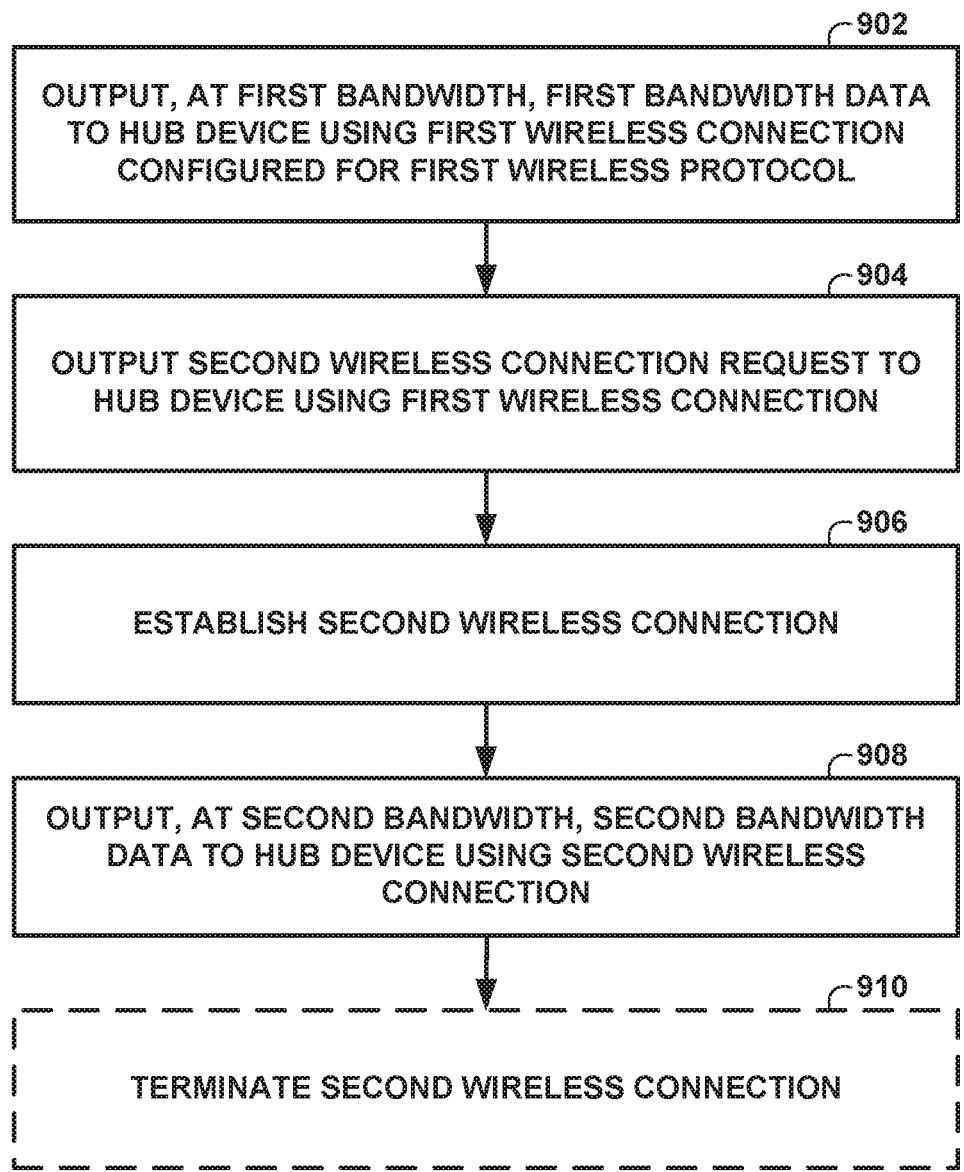
FIG. 9 is a flowchart illustrating example techniques for wirelessly connecting devices using multiple wireless protocols, in accordance with some examples of this disclosure.

FIG. 9 is a flowchart illustrating example techniques for wirelessly connecting devices using multiple wireless protocols, in accordance with some examples of this disclosure. The examples of FIGS. 1A-1D and 2-8 are referred to for example purposes only.

In accordance with the techniques of the disclosure, processing circuitry 15 may output, at a first bandwidth, first bandwidth data 17 to hub device 12 using a first wireless connection 16 configured for a first wireless protocol (902). For example, processing circuitry 15 may output, at a first bandwidth, first bandwidth data 17 to hub device 12 using a first wireless connection 16 configured for IEEE 802.15.4. In response to determining that sensor device 14 has second bandwidth data to output to hub device 12, processing circuitry 15 may output a second wireless connection request 19 to hub device 12 using first wireless connection 16 configured for the first wireless protocol (904). In response to hub device 12 outputting, in response to the second wireless connection request 19, information for establishing a second wireless connection with sensor device 14, processing circuitry 15 may establish second wireless connection 18 configured for a second wireless protocol different from the first wireless protocol (906). For example, processing circuitry 15 may establish second wireless connection 18 to be configured for BLUETOOTH.

Processing circuitry 15 may output, at a second bandwidth, second bandwidth data 21 to hub device 12 using second wireless connection 18 (908). In some examples, the second bandwidth is greater than the first bandwidth. In some examples, processing circuitry 15 may optionally terminate the second wireless connection (910).

The following numbered examples demonstrate one or more aspects of the disclosure.

Example 1. A sensor device of a set of sensor devices configured to be enrolled with a hub device, the sensor device comprising processing circuitry configured to: output, at a first bandwidth, first bandwidth data to the hub device using a first wireless connection configured for a first wireless protocol; in response to determining that the sensor device has second bandwidth data to output to the hub device at a second bandwidth, output a second wireless connection request to the hub device using the first wireless connection configured for the first wireless protocol; in response to the hub device outputting, in response to the second wireless connection request, information for establishing a second wireless connection with the sensor device, establish the second wireless connection, the second wireless connection being configured for a second wireless protocol different from the first wireless protocol; and output, at the second bandwidth, the second bandwidth data to the hub device using the second wireless connection, the second bandwidth being greater than the first bandwidth.

Example 2. The sensor device of example 1, wherein the processing circuitry is configured to terminate the second wireless connection after outputting the second bandwidth data.

Example 3. The sensor device of examples 1 or 2, wherein the processing circuitry, the hub device, or a combination of the processing circuitry and the hub device are configured to terminate the second wireless connection a predetermined period of time after the sensor device establishes the second wireless connection.

Example 4. The sensor device of any of examples 1-3, wherein the first wireless protocol specifies a first wireless protocol bandwidth limit that is greater than or equal to the first bandwidth; wherein the second wireless protocol specifies a second wireless protocol bandwidth limit that is greater than or equal to the second bandwidth; and wherein the second wireless protocol bandwidth limit is greater than the first wireless protocol bandwidth.

Example 5. The sensor device of any of examples 1-4, wherein the second wireless protocol includes a BLUETOOTH wireless protocol.

Example 6. The sensor device of any of examples 1-5, wherein the information for establishing the second wireless connection comprises one or more network parameters for the second wireless connection; and wherein, to establish the second wireless connection, the processing circuitry is configured to establish the second wireless connection using the one or more network parameters.

Example 7. The sensor device of any of examples 1-6, wherein the one or more network parameters comprise one or more of: a media access control (MAC) address of the sensor device and a MAC address of the hub device; a start time to begin transmitting the second bandwidth data; an indication of a starting frequency for the second wireless connection; an indication of a frequency hop set for the second wireless connection; or a connection interval for the second wireless connection.

Example 8. The sensor device of any of examples 1-7, wherein the first wireless protocol includes an IEEE 802.15.4 wireless protocol.

Example 9. The sensor device of any of examples 1-8, wherein the first wireless protocol bandwidth limit is less than 250 kbps; and wherein the second wireless protocol bandwidth limit is greater than 250 kbps.

Example 10. The sensor device of any of examples 1-9, wherein the first wireless protocol is configured to establish a first number of concurrent first wireless connections to the set of sensor devices; and wherein the second wireless protocol is configured to establish a second number of concurrent second wireless connections to the set of sensor devices, the first number of first concurrent bandwidth connections being greater than the second number of concurrent second wireless connection.

Example 11. The sensor device of any of examples 1-10, wherein, to output the first bandwidth data to the hub device, the processing circuitry is configured to output the first bandwidth data to a first friend node, wherein the first friend node is configured to output the first bandwidth data to the hub device using the first wireless protocol; and wherein, to output high first bandwidth data to the hub device, the processing circuitry is configured to output the second bandwidth data to a second friend node, wherein the second friend node is configured to output the second bandwidth data to the hub device using the second wireless protocol.

Example 12. The sensor device of any of examples 1-11, wherein the first friend node comprises another sensor device of the set of sensor devices.

Example 13. The sensor device of any of examples 1-12, wherein the processing circuitry is configured to: generate sensor data; and determine that the sensor device has the second bandwidth data to output to the hub device in response to determining that the sensor data includes audio content, video content, or a combination of audio content and video content, wherein the second bandwidth data includes the sensor data.

Example 14. The sensor device of any of examples 1-13, wherein the processing circuitry is configured to generate the first bandwidth data to comprise one or more of: the second wireless connection request; status data for the sensor device; battery life data for the sensor device; or configuration data for the sensor device.

Example 15. The sensor device of any of examples 1-14, wherein the sensor device is configured to output the first bandwidth data, the second bandwidth data, or a combination of the first bandwidth data and the second bandwidth data to a wide area network (WAN) using a WAN interface of the hub device.

Example 16. The sensor device of any of examples 1-15, wherein the WAN interface includes a Wi-Fi router; or wherein the WAN interface includes Ethernet.

Example 17. A method comprising: outputting, by processing circuitry of a sensor device, at a first bandwidth, first bandwidth data to a hub device using a first wireless connection configured for a first wireless protocol; in response to determining that the sensor device has second bandwidth data to output to the hub device at a second bandwidth, outputting, by the processing circuitry, a second wireless connection request to the hub device using the first wireless connection configured for the first wireless protocol; in response to the hub device outputting, in response to the second wireless connection request, information for establishing a second wireless connection with the sensor device, establishing, by the processor, the second wireless connection, the second wireless connection being configured for a second wireless protocol different from the first wireless protocol; and outputting, by the processing circuitry, at the second bandwidth, the second bandwidth data to the hub device using the second wireless connection, the second bandwidth being greater than the first bandwidth.

Example 18. The method of example 17, comprising terminating, by the processing circuitry, the second wireless connection after outputting the second bandwidth data.

Example 19. A system comprising: a hub device; a plurality of sensor devices enrolled with the hub device, wherein a sensor device of the plurality of sensor devices comprises first processing circuitry configured to: output, at a first bandwidth, first bandwidth data to the hub device using a first wireless protocol; and in response to determining that the sensor device has second bandwidth data to output to the hub device at a second bandwidth, output a second wireless connection request to the hub device using the first wireless protocol; wherein the hub device comprises second processing circuitry configured to output information for establishing a second wireless connection with the sensor device in response to the second wireless connection request; and wherein the first processing circuitry is further configured to: in response to the hub device outputting the information for establishing the second wireless connection, establish the second wireless connection using a second wireless protocol different from the first wireless protocol to establish the second wireless connection; and output, at the second bandwidth, the second bandwidth data to the hub device using the second wireless connection, the second bandwidth being greater than the first bandwidth.

Example 20. The system of example 19, wherein the hub device is directly connected to a mobile network interface configured to establish connectivity to cloud services; and wherein the hub device is configured to provide data from the sensor devices to the mobile network interface to minimize a number of sensor devices of the plurality of sensor devices directly connected to the mobile network interface.

The disclosure may be implemented using computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A sensor device of a set of sensor devices configured to be enrolled with a hub device, the sensor device comprising processing circuitry configured to:
    output, at a first bandwidth, first bandwidth data to the hub device using a first wireless connection configured for a first wireless protocol;
    in response to determining that the sensor device has second bandwidth data to output to the hub device at a second bandwidth, output a second wireless connection request to the hub device using the first wireless connection configured for the first wireless protocol;
    in response to receiving from the hub device, in response to the second wireless connection request, information that includes one or more network parameters for establishing a second wireless connection with the sensor device, establish the second wireless connection using the one or more network parameters, the second wireless connection being configured for a second wireless protocol different from the first wireless protocol; and output, at the second bandwidth, the second bandwidth data to the hub device using the second wireless connection, the second bandwidth being greater than the first bandwidth.

2. The sensor device of claim 1, wherein the processing circuitry is configured to terminate the second wireless connection after outputting the second bandwidth data.

3. The sensor device of claim 1, wherein the processing circuitry, the hub device, or a combination of the processing circuitry and the hub device are configured to terminate the second wireless connection a predetermined period of time after the sensor device establishes the second wireless connection.

4. The sensor device of claim 1,
wherein the first wireless protocol specifies a first wireless protocol bandwidth limit that is greater than or equal to the first bandwidth;
wherein the second wireless protocol specifies a second wireless protocol bandwidth limit that is greater than or equal to the second bandwidth; and
wherein the second wireless protocol bandwidth limit is greater than the first wireless protocol bandwidth.

5. The sensor device of claim 1, wherein the second wireless protocol includes a BLUETOOTH wireless protocol.

6. The sensor device of claim 1, wherein the one or more network parameters comprise one or more of:
a media access control (MAC) address of the sensor device and a MAC address of the hub device;
a start time to begin transmitting the second bandwidth data;
an indication of a starting frequency for the second wireless connection;
an indication of a frequency hop set for the second wireless connection; or
a connection interval for the second wireless connection.

7. The sensor device of claim 1, wherein the first wireless protocol includes an IEEE 802.15.4 wireless protocol.

8. The sensor device of claim 1,
wherein the first wireless protocol bandwidth limit is less than 250 kbps; and
wherein the second wireless protocol bandwidth limit is greater than 250 kbps.

9. The sensor device of claim 1,
wherein the first wireless protocol is configured to establish a first number of concurrent first wireless connections to the set of sensor devices; and
wherein the second wireless protocol is configured to establish a second number of concurrent second wireless connections to the set of sensor devices, the first number of first concurrent bandwidth connections being greater than the second number of concurrent second wireless connections.

10. The sensor device of claim 1,
wherein, to output the first bandwidth data to the hub device, the processing circuitry is configured to output the first bandwidth data to a first friend node, wherein the first friend node is configured to output the first bandwidth data to the hub device using the first wireless protocol; and wherein, to output the second bandwidth data to the hub device, the processing circuitry is configured to output the second bandwidth data to a second friend node, wherein the second friend node is configured to output the second bandwidth data to the hub device using the second wireless protocol.

11. The sensor device of claim 10, wherein the first friend node comprises another sensor device of the set of sensor devices.

12. The sensor device of claim 1, wherein the processing circuitry is configured to:
generate sensor data; and
determine that the sensor device has the second bandwidth data to output to the hub device in response to determining that the sensor data includes audio content, video content, or a combination of audio content and video content, wherein the second bandwidth data includes the sensor data.

13. The sensor device of claim 1, wherein the processing circuitry is configured to generate the first bandwidth data to comprise one or more of:
the second wireless connection request;
status data for the sensor device;
battery life data for the sensor device; or
configuration data for the sensor device.

14. The sensor device of claim 1, wherein the sensor device is configured to output the first bandwidth data, the second bandwidth data, or a combination of the first bandwidth data and the second bandwidth data to a wide area network (WAN) using a WAN interface of the hub device.

15. The sensor device of claim 14,
wherein the WAN interface includes a Wi-Fi router; or
wherein the WAN interface includes Ethernet.

16. A method comprising:
outputting, by processing circuitry of a sensor device, at a first bandwidth, first bandwidth data to a hub device using a first wireless connection configured for a first wireless protocol;
in response to determining that the sensor device has second bandwidth data to output to the hub device at a second bandwidth, outputting, by the processing circuitry, a second wireless connection request to the hub device using the first wireless connection configured for the first wireless protocol;
in response to receiving from the hub device, in response to the second wireless connection request, information that includes one or more network parameters for establishing a second wireless connection with the sensor device, establishing, by the processing circuitry, the second wireless connection using the one or more network parameters, the second wireless connection being configured for a second wireless protocol different from the first wireless protocol; and
outputting, by the processing circuitry, at the second bandwidth, the second bandwidth data to the hub device using the second wireless connection, the second bandwidth being greater than the first bandwidth.

17. The method of claim 16, comprising terminating, by the processing circuitry, the second wireless connection after outputting the second bandwidth data.

18. A system comprising:
a hub device;
a plurality of sensor devices enrolled with the hub device, wherein a sensor device of the plurality of sensor devices comprises first processing circuitry configured to:

output, at a first bandwidth, first bandwidth data to the hub device using a first wireless protocol; and in response to determining that the sensor device has second bandwidth data to output to the hub device at a second bandwidth, output a second wireless connection request to the hub device using the first wireless protocol;

wherein the hub device comprises second processing circuitry configured to output information that includes one or more network parameters for establishing a second wireless connection with the sensor device in response to the second wireless connection request; and wherein the first processing circuitry is further configured to:

in response to the hub device outputting the information that includes the one or more network parameters for establishing the second wireless connection, establish the second wireless connection using a second wireless protocol different from the first wireless protocol and using the one or more network parameters to establish the second wireless connection; and output, at the second bandwidth, the second bandwidth data to the hub device using the second wireless connection, the second bandwidth being greater than the first bandwidth.

19. The system of claim 18, wherein the hub device is directly connected to a mobile network interface configured to establish connectivity to cloud services; and wherein the hub device is configured to provide data from the sensor devices to the mobile network interface to minimize a number of sensor devices of the plurality of sensor devices directly connected to the mobile network interface.

\* \* \* \* \*